US007939476B2

(12) United States Patent
Eadie et al.

(10) Patent No.: US 7,939,476 B2
(45) Date of Patent: *May 10, 2011

(54) MODIFIED FRICTION CONTROL COMPOSITIONS

(75) Inventors: Don Eadie, Vancouver (CA); Xin Lu, North Vancouver (CA); John Cotter, Vancouver (CA)

(73) Assignee: Kelsan Technologies Corp., British Columbia (CA)

( * ) Notice: Subject to any disclaimer, the term of this patent is extended or adjusted under 35 U.S.C. 154(b) by 697 days.

This patent is subject to a terminal disclaimer.

(21) Appl. No.: 11/198,163

(22) Filed: Aug. 8, 2005

(65) Prior Publication Data

US 2007/0032389 A1 Feb. 8, 2007

Related U.S. Application Data

(63) Continuation-in-part of application No. PCT/CA2005/001244, filed on Aug. 8, 2005, which is a continuation of application No. 10/917,389, filed on Aug. 13, 2004, now Pat. No. 7,160,378.

(51) Int. Cl.
*C10M 169/00* (2006.01)
(52) U.S. Cl. ........................ 508/110; 508/591
(58) Field of Classification Search ............ 508/110
See application file for complete search history.

(56) References Cited

U.S. PATENT DOCUMENTS

| | | | | |
|---|---|---|---|---|
| 4,052,323 | A | 10/1977 | Feneberger et al. | 252/23 |
| 4,303,537 | A | 12/1981 | Laepple et al. | 252/30 |
| 4,846,733 | A | 7/1989 | Rizvi et al. | |
| 4,915,856 | A | 4/1990 | Jamison | 252/26 |
| 5,173,204 | A | 12/1992 | Chiddick et al. | 252/30 |
| 5,271,854 | A | 12/1993 | Staub et al. | 252/29 |
| 5,308,516 | A | 5/1994 | Chiddick | 252/30 |
| 5,477,941 | A * | 12/1995 | Kumar et al. | 184/3.2 |
| 6,759,372 | B2 | 7/2004 | Cotter | 508/143 |
| 6,855,673 | B2 | 2/2005 | Cotter et al. | 508/143 |
| 2003/0013615 | A1* | 1/2003 | Levy | 508/113 |
| 2003/0022797 | A1* | 1/2003 | Oohira et al. | 508/107 |
| 2003/0195123 | A1 | 10/2003 | Cotter | 508/143 |
| 2004/0038831 | A1 | 2/2004 | Eadie | 508/110 |
| 2006/0089276 | A1* | 4/2006 | Klotz | 508/464 |

FOREIGN PATENT DOCUMENTS

| | | |
|---|---|---|
| CA | 2 321 507 | 3/2002 |
| CA | 2 381 678 | 10/2003 |
| CA | 2 448 702 | 5/2004 |
| DE | 24 07 123 | 8/1975 |
| EP | 0 244 733 | 11/1987 |
| EP | 0372559 | 6/1990 |
| EP | 1 357 175 | 10/2003 |
| GB | 1 484 736 | 9/1977 |
| WO | WO 90/15123 | 12/1990 |
| WO | WO 02/26919 | 4/2002 |
| WO | WO 2004/096960 | 11/2004 |

OTHER PUBLICATIONS

Broster et al., Wheel/Rail Adhesion: Its Relation to Rail Contamination on British Railways (1974) Wear 29:309-321.
Harrison et al., Recent Developments in COF Measurements at the Rail/Wheel Interface (2000) Proceedings of the 5th International Conference on Contact Mechanics and Wear of Rail./Wheel Systems CM 2000 (Seiken Symposium No. 27), pp. 30-34.
Matsumoto et al. Creep Force Characteristics Between Rail and Wheel on Scaled Model (2000) Proceedings of the 5th International Conference on Contact Mechanics and Wear of Rail./Wheel Systems CM 2000 (Seiken Symposium No. 27), pp. 197-202.
English Translation of foreign examination report of Chinese Application Serial No. 200480019038.8 (Jul. 10, 2009).
Foreign examination report of Japanese Application Serial No. 2002-530687 (Jul. 30, 2009).
English Translation of foreign examination report of Japanese Application Serial No. 2002-530687 (Jul. 30, 2009).
European Search Report for EP 1 418 222 (Appl. No. 03257049.1), Freeze Tolerant Friction Control Compositions, Cotter et al., Issued Oct. 19, 2009.
Notice of Allowance for CN 20040019028.8, Method for Reducing Wear of Steel Elements in Sliding-Rolling Contact, Chinese Patent Office, Jan. 15, 2010.
European Search Report for EP 1 357 175 (Appl. No. 02252651.1), Friction Control Composition with Enhanced Retentivity, Cotter et al., Issued Feb. 1, 2010.
Database WPI Week 199329, Thomson Scientific, London GB, AN 1993-234427 XP002551165 & SU1752190A3 *abstract*.
Anonymous: Antifreeze compsns., useful for engine cooling systems—contg. depressants esp. ethylene glycol and propylene glycol, dibasic acids, aromatic monobasic acids and a hydrocarbyl triazole. Research Disclosure, vol. 390, No. 013, Oct. 10, 1996 XP002551169 Emsworth GB *abstract*.

* cited by examiner

*Primary Examiner* — Glenn A Caldarola
*Assistant Examiner* — Taiwo Oladapo
(74) *Attorney, Agent, or Firm* — Cooley LLP

(57) ABSTRACT

The present invention provides a friction control composition comprising a binder a rheological control agent, and optionally a lubricant. The liquid friction control composition may also comprise other components a wetting agent, a consistency modifier, and a preservative. The liquid friction control compositions may be used to modify the interfacial friction characteristics in sliding and rolling-sliding contact such as steel wheel-rail systems including mass transit and freight systems. A method of reducing lateral force, reducing energy consumption, or controlling friction between a metal surface and a second metal surface by applying the composition to metal surface, for example a top of rail or wheel, is also provided. The composition may be sprayed onto the rail surface.

22 Claims, 11 Drawing Sheets

Note: Non-dimensional increase of friction modifier/lubricant thickness/amount left to right.
Figure 1. Conceptual Performance of a Lubricant and a Friction Modifier

MODIFIED FRICTION CONTROL COMPOSITIONS

RELATED APPLICATIONS

This application is a continuation-in-part of international application No. PCT/CA2005/001244, filed Aug. 8, 2005.

This application is a continuation-in-part of U.S. application Ser. No. 10/917,389, filed Aug. 13, 2004, now U.S. Pat. No. 7,160,378, which is incorporated by reference in its entirety.

FIELD OF INVENTION

The present invention relates to friction control compositions for applying to steel surfaces that are in sliding or rolling-sliding contact.

BACKGROUND OF THE INVENTION

The control of friction and wear of metal mechanical components that are in sliding or rolling-sliding contact is of great importance in the design and operation of many machines and mechanical systems. For example, many steel-rail and steel-wheel transportation systems including freight, passenger and mass transit systems suffer from the emission of high noise levels and extensive wear of mechanical components such as wheels, rails and other rail components such as ties. The origin of such noise emission, and the wear of mechanical components may be directly attributed to the frictional forces and behaviour that are generated between the wheel and the rail during operation of the system.

In a dynamic system wherein a wheel rolls on a rail, there is a constantly moving zone of contact. For purposes of discussion and analysis, it is convenient to treat the zone of contact as stationary while the rail and wheel move through the zone of contact. When the wheel moves through the zone of contact in exactly the same direction as the rail, the wheel is in an optimum state of rolling contact over the rail. In such a case, no appreciable friction exists between the wheel and the rail. However, because the wheel and the rail are profiled, often misaligned and subject to motions other than strict rolling, the respective velocities at which the wheel and the rail move through the zone of contact are not always the same. This is often observed when fixed-axle railcars negotiate curves wherein true rolling contact can only be maintained on both rails if the inner and the outer wheels rotate at different peripheral speeds. This is not possible on most fixed-axle railcars. Thus, under such conditions, the wheels undergo a combined rolling and sliding movement relative to the rails. Sliding movement may also arise when traction is lost on inclines thereby causing the driving wheels to slip.

The magnitude of the sliding movement is roughly dependent on the difference, expressed as a percentage, between the rail and wheel velocities at the point of contact. This percentage difference is termed creepage.

At creepage levels larger than about 1%, appreciable frictional forces are generated due to sliding, and these frictional forces result in noise and wear of components (H. Harrison, T. McCanney and J. Cotter (2000), Recent Developments in COF Measurements at the Rail/Wheel Interface, Proceedings The 5th International Conference on Contact Mechanics and Wear of Rail/Wheel Systems CM 2000 (SEIKEN Symposium No. 27), pp. 30-34, which is incorporated herein by reference). The noise emission is a result of a negative friction characteristic that is present between the wheel and the rail system. A negative friction characteristic is one wherein friction between the wheel and rail generally decreases as the creepage of the system increases in the region where the creep curve is saturated. Theoretically, noise and wear levels on wheel-rail systems may be reduced or eliminated by making the mechanical system very rigid, reducing the frictional forces between moving components to very low levels or by changing the friction characteristic from a negative to a positive one, that is by increasing friction between the rail and wheel in the region where the creep curve is saturated. Unfortunately, it is often impossible to impart greater rigidity to a mechanical system, such as in the case of a wheel and rail systems used by most trains. Alternatively, reducing the frictional forces between the wheel and the rail may greatly hamper adhesion and braking and is not always suitable for rail applications. In many situations, imparting a positive frictional characteristic between the wheel and rail is effective in reducing noise levels, wear of components, decreasing drawbar force reduction, lateral force reduction, or a combination thereof.

It is also known that, wear of train wheels and rails may be accentuated by persistent to and fro movement resulting from the presence of clearances necessary to enable a train to move over a track. These effects may produce undulatory wave patterns on rail surfaces and termed corrugations. Corrugations increase noise levels beyond those for smooth rail-wheel interfaces and ultimately the problem can only be cured by grinding or machining the rail and wheel surfaces. This is both time consuming and expensive.

There are a number of lubricants known in the art and some of these are designed to reduce rail and wheel wear on railroads and rapid transit systems. For example, U.S. Pat. No. 4,915,856 discloses a solid anti-wear, anti-friction lubricant. The product is a combination of anti-ware and anti-friction agents suspended in a solid polymeric carrier for application to the top of a rail. Friction of the carrier against the wheel activates the anti-wear and anti-friction agents. However, the product does not display a positive friction characteristic.

There are several drawbacks associated with the use of compositions of the prior art, including solid stick compositions. First, outfitting railcars with friction modifier stick compositions and applying to large stretches of rail is wasteful if a noise problem exists at only a few specific locations on a track. Second, some railroads have a maintenance cycle that may last as long as 120 days. There is currently no stick technology that will allow solid lubricant or friction modifiers to last this period of time. Third, freight practice in North America is for freight cars to become separated all over the continent, therefore friction modifier sticks are required on many if not all rail cars which would be expensive and impractical. Similarly, top of rail friction management using solid sticks requires a closed system to achieve adequate buildup of the friction control product on the rail. However, solid stick compositions may be effectively used within closed systems. A closed system is one where there is essentially a captive fleet without external trains entering or leaving the system. While city transit systems are typically closed, freight systems are typically open with widespread interchange of cars. In such a system, solid stick technology may be less practical.

U.S. Pat. Nos. 5,308,516, 5,173,204 and WO 90/15123 relate to solid friction control compositions having high and positive friction characteristics. These compositions display increased friction as a function of creepage, and comprise resins to impart the solid consistency of these formulations. The resins employed included amine and polyamide epoxy resins, polyurethane, polyester, polyethylene or polypropylene resins.

EP 0372559 relates to solid coating compositions for lubrication which are capable of providing an optimum friction coefficient to places where it is applied, and at the same time are capable of lowering abrasion loss. However, the compositions do not have positive friction characteristics.

Many lubricant compositions of the prior art are either formulated into solid sticks or are viscous liquids (pastes) and thus may not be applied to sliding and rolling-sliding systems as an atomized spray. The application of a liquid friction control composition in an atomized spray, in many instances reduces the amount of the composition to be applied to a rail system and provides for a more even distribution of the friction control composition at the required site. Furthermore, atomized sprays dry rapidly which may lead to minimizing the potential for undesired locomotive wheel slip.

Applying liquid-based compositions to the top of the rail has distinct advantages over using a solid stick delivery system applied to the wheels. Using a liquid system allows for site-specific application via a hirail, wayside or onboard system. Such specific application is not possible with the solid delivery system that continually applies product to the wheels. Furthermore the low transference rate of the solid stick application method will not yield any benefits until the track is fully conditioned. This is an unlikely situation for a Class 1 rail line due to the extensive amount of track that must be covered and the presence of rail cars not possessing the solid stick lubricant. Liquid systems avoid this problem as the product is applied to the top of the rail, allowing all axles of the train to come in contact with, and benefit immediately from the product. However, this is not always true as the ability of the applied film to remain adhered to the rail and provide friction control is limited. Under certain conditions liquid products have worn off before a single train pass.

Compositions that exhibit the property of imparting friction control between steel bodies in sliding rolling contact typically comprise a friction modifier such as calcium or magnesium carbonate, magnesium silicate, calcium sulphate, asbestos, aluminium silicate, silica, zinc stearate, aluminium stearate, magnesium carbonate, lead oxide, zinc oxide, antimony oxide, aluminum oxide, magnesium oxide; and zirconium oxide. For example, WO 02/26919 (to Keslan technologies Corp.) describes compositions for application to the surface of steel bodies in sliding-rolling contact having a positive friction characteristic. The friction control composition comprises a rheological agent, a retentivity agent a, lubricant and a friction modifier (as described in the list above), wherein one of the lubricant or the friction modifier is always present in the composition. Similarly, US Publications 2003 0195123 and 2004 038831 (to Keslan technologies Corp.) disclose frictional control compositions with enhanced retentivity comprising a rheological agent, antioxidant; and one or more of a retentivity agent, a lubricant and a friction modifier, again as described above. The friction modifier compositions that exhibit friction control functions comprise at least one of the lubricant or friction modifier, in the presence of a retentive agent (or binder). Similar friction modifiers are disclosed in U.S. Pat. Nos. 5,308,516, and 5,173,204.

SUMMARY OF THE INVENTION

The present invention relates to friction control compositions for applying to surfaces which are in sliding or rolling-sliding contact.

It is an object of the present invention to provide a novel modified friction control composition.

The present invention provides a friction control composition comprising:

a) from about 40 to about 80 weight percent water;
b) from about 1.0 to about 25 weight percent binder;
c) from 0 to about 10 weight percent lubricant; and
d) from about 0.5 to about 5 weight percent rheological control agent, wherein the friction control composition does not comprise a friction modifier.

The present invention pertains to a friction control composition as just defined further comprising from 0 to about 5 weight percent anti-oxidant. The friction control composition may further comprise from 0 to about 5 weight percent antioxidant, and from 0 to about 25 weight percent freezing point depressant. The friction control composition may also comprise a wetting agent, an antibacterial agent, a consistency modifier, a defoaming agent, or a combination thereof.

Furthermore, the present invention pertains to friction control compositions as defined above, wherein the binder (retentivity agent) is selected from the group consisting of acrylic, polyvinyl alcohol, polyvinyl chloride, oxazoline, epoxy, alkyd, modified alkyd, acrylic latex, acrylic epoxy hybrids, polyurethane, styrene acrylate, and styrene butadiene based compounds. It is preferred that the binder is a styrene butadiene compound and the antioxidant is a mixture of a thioester type antioxidant and a hindered phenol type antioxidant. More preferably, the retentivity agent is DOW LATEX 226® and the antioxidant is OCTOLITE® 424-50.

The present invention also relates to friction control compositions as defined above, which further comprise from about 0.5 to about 2 weight percent antioxidant. In a preferred embodiment, the antioxidant is selected from the group consisting of a styrenated phenol type antioxidant; an amine type antioxidant, a hindered phenol type antioxidant; a thioester type antioxidant, and a combination thereof.

The present invention also relates to a friction control composition as described above, wherein the freezing point depressant is a glycol ether or a propylene glycol ether. In a preferred embodiment, the propylene glycol ether is selected from the group consisting of PROGLYDE® DMM, ARCOSOLV® PTB, ARCOSOLV® PMA, ARCOSOLV® PnP, DOWANOL® DPnP, DOWANOL® DPM and CRYOTECH®PnP.

The present invention also provides a friction control composition as defined above, wherein the freezing point depressant is selected from the group consisting of propylene glycol, dipropylene glycol methyl ester, dipropylene glycol dimethyl ether, dipropylene glycol monopropyl ether, propylene glycol tertiary butyl ether, propylene glycol normal propyl ether, dipropylene glycol monopropyl ether, propylene glycol methyl ether acetate, propylene glycol methyl ether acetate, and ethylene glycol butyl ether.

The present invention also provides a friction control composition as defined above, wherein the freezing point depressant is a salt, for example, betaine HCl, cesium chloride, potassium chloride, potassium acetate, sodium acetate, potassium chromate, sodium chloride, sodium formate, or sodium tripolyphosphate. The present invention further provides a friction control composition, as defined above, wherein the freezing point depressant is a composition comprising a metal acetate, such as potassium acetate or sodium acetate. Examples of such compositions include without limitation, CRYOTECH® E36, which comprises potassium acetate, and CRYOTECH® NAAC, which comprises sodium acetate.

The present invention even further provides a friction control composition, as defined above, wherein the freezing point depressant is an acid, such as, citric acid, lactic acid, or succinic acid, a heterocyclic amine, such as nicotinamide, an aryl alcohol, such as phenol, an amino acid, an amino acid derivative, such as trimethyl glycine, or a carbohydrate, such as D-xylose.

The present invention also pertains to a friction control composition comprising:
a) from about 60 to about 80 weight percent water;
b) from about 5 to about 15 weight percent binder;
c) from about 0 to about 5 weight percent lubricant; and
d) from about 0.5 to about 5 weight percent rheological control agent, wherein the friction control composition does not comprise a friction modifier.

The present invention pertains to a friction control composition as just defined further comprising from 0 to about 5 weight percent anti-oxidant. The friction control composition may further comprise from 0 to about 5 weight percent anti-oxidant, and from 0 to about 25 weight percent freezing point depressant. The friction control composition may also comprise a wetting agent, an antibacterial agent, a consistency modifier, a defoaming agent, or a combination thereof.

Furthermore, the present invention pertains to friction control compositions as defined above, wherein the binder (retentivity agent) is selected from the group consisting of acrylic, polyvinyl alcohol, polyvinyl chloride, oxazoline, epoxy, alkyd, modified alkyd, acrylic latex, acrylic epoxy hybrids, polyurethane, styrene acrylate, and styrene butadiene based compounds. It is preferred that the binder is a styrene butadiene compound and the antioxidant is a mixture of a thioester type antioxidant and a hindered phenol type antioxidant. More preferably, the retentivity agent is DOW LATEX 226® and the antioxidant is OCTOLITE® 424-50.

The present invention also relates to friction control compositions as defined above, which further comprise from about 0.5 to about 2 weight percent antioxidant. In a preferred embodiment, the antioxidant is selected from the group consisting of a styrenated phenol type antioxidant; an amine type antioxidant, a hindered phenol type antioxidant; a thioester type antioxidant, and a combination thereof.

The present invention also relates to a friction control composition as described above, wherein the freezing point depressant is a glycol ether or a propylene glycol ether. In a preferred embodiment, the propylene glycol ether is selected from the group consisting of PROGLYDE® DMM, ARCOSOLV® PTB, ARCOSOLV® PMA, ARCOLSOV® PnP, DOWANOL® DPnP, DOWANOL® DPM and CRYOTECH® PnP.

The present invention also provides a friction control composition as defined above, wherein the freezing point depressant is selected from the group consisting of propylene glycol, dipropylene glycol methyl ester, dipropylene glycol dimethyl ether, dipropylene glycol monopropyl ether, propylene glycol tertiary butyl ether, propylene glycol normal propyl ether, dipropylene glycol monopropyl ether, propylene glycol methyl ether acetate, propylene glycol methyl ether acetate, and ethylene glycol butyl ether.

The present invention also provides a friction control composition as defined above, wherein the freezing point depressant is a salt, for example, betaine HCl, cesium chloride, potassium chloride, potassium acetate, sodium acetate, potassium chromate, sodium chloride, sodium formate, or sodium tripolyphosphate.

The present invention also provides a friction control composition as defined above, wherein the freezing point depressant is a salt, for example, betaine HCl, cesium chloride, potassium chloride, potassium acetate, sodium acetate, potassium chromate, sodium chloride, sodium formate, or sodium tripolyphosphate. The present invention further provides a friction control composition, as defined above, wherein the freezing point depressant is a composition comprising a metal acetate, such as potassium acetate or sodium acetate. Examples of such compositions include without limitation, CRYOTECH® E36, which comprises potassium acetate, and CRYOTECH® NAAC, which comprises sodium acetate.

The present invention even further provides a friction control composition, as defined above, wherein the freezing point depressant is an acid, such as, citric acid, lactic acid, or succinic acid, a heterocyclic amine, such as nicotinamide, an aryl alcohol, such as phenol, an amino acid, an amino acid derivative, such as trimethyl glycine, or a carbohydrate, such as D-xylose.

The present invention also provides a method of controlling friction between a metal surface and a second metal surface by applying a friction control composition as defined above, for example comprising:
a) from about 40 to about 80 weight percent water;
b) from about 1.0 to about 25 weight percent binder;
c) from 0 to about 10 weight percent lubricant; and
d) from about 0.5 to about 5 weight percent rheological control agent, wherein the friction control composition does not comprise a friction modifier.
to one or more than one of the metal surface. The metal surface may be a rail surface or wheel. Furthermore, the composition may be sprayed onto the rail surface. The friction control composition may further comprise from 0 to about 5 weight percent anti-oxidant, from 0 to about 5 weight percent anti-oxidant, and from 0 to about 25 weight percent freezing point depressant. The friction control composition may also comprise a wetting agent, an antibacterial agent, a consistency modifier, a defoaming agent, or a combination thereof as desired.

The present invention pertains to a method of reducing lateral force in a rail system comprising applying a friction control composition as defined above, for example comprising:
a) from about 40 to about 80 weight percent water;
b) from about 1.0 to about 25 weight percent binder;
c) from 0 to about 10 weight percent lubricant; and
d) from about 0.5 to about 5 weight percent rheological control agent, wherein the friction control composition does not comprise a friction modifier.
onto the wheel or top of rail. The composition may be sprayed onto the top of rail. Furthermore, the composition may be sprayed onto the rail surface. The friction control composition may further comprise from 0 to about 5 weight percent anti-oxidant, from 0 to about 5 weight percent anti-oxidant, and from 0 to about 25 weight percent freezing point depressant. The friction control composition may also comprise a wetting agent, an antibacterial agent, a consistency modifier, a defoaming agent, or a combination thereof as desired.

The present invention also relates to a method of reducing energy consumption in a rail system comprising applying a friction control composition as defined above, for example comprising:
a) from about 40 to about 80 weight percent water;
b) from about 1.0 to about 25 weight percent binder;
c) from 0 to about 10 weight percent lubricant; and
d) from about 0.5 to about 5 weight percent rheological control agent, wherein the friction control composition does not comprise a friction modifier, onto the wheel or top of rail. The composition may be sprayed onto the top of rail. Furthermore, the composition may be sprayed onto the rail surface. The friction control composition may further comprise from 0 to about 5 weight percent anti-oxidant, from 0 to about 5 weight percent anti-oxidant, and from 0 to about 25 weight percent freezing point depressant. The friction control composition may also comprise a wetting agent, an antibacterial agent, a consistency modifier, a defoaming agent, or a combination thereof as desired.

The present invention provides friction control compositions that exhibit the property of controlling friction between steel surfaces, and may be used to reduce lateral forces and energy consumption in rail systems. These compositions maintain a coefficient to friction (CoF) between two metal surfaces at about 0.35±0.07, or preferably at about 0.35±0.05, for example, between about 0.3 and about 0.45, or any amount therebetween. However, the compositions of the present invention do not comprise prior art friction modifiers such as calcium or magnesium carbonate, magnesium silicate, calcium sulphate, asbestos, aluminium silicate, silica, zinc stearate, aluminium stearate, magnesium carbonate, lead oxide, zinc oxide, antimony oxide, aluminium oxide, magnesium oxide; and zirconium oxide. Rather, it has been observed that the compositions of the present invention comprising polymers (termed binders or retentivity agents herein) exhibit the property of maintaining a CoF within the desired range. The compositions described herein may also comprise an added lubricant as desired.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 2 shows the control of friction for different compositions in the absence or presence of a film-forming binder.

FIG. 3 shows the control of friction for compositions comprising a film-forming binder.

DETAILED DESCRIPTION

Figure 1:
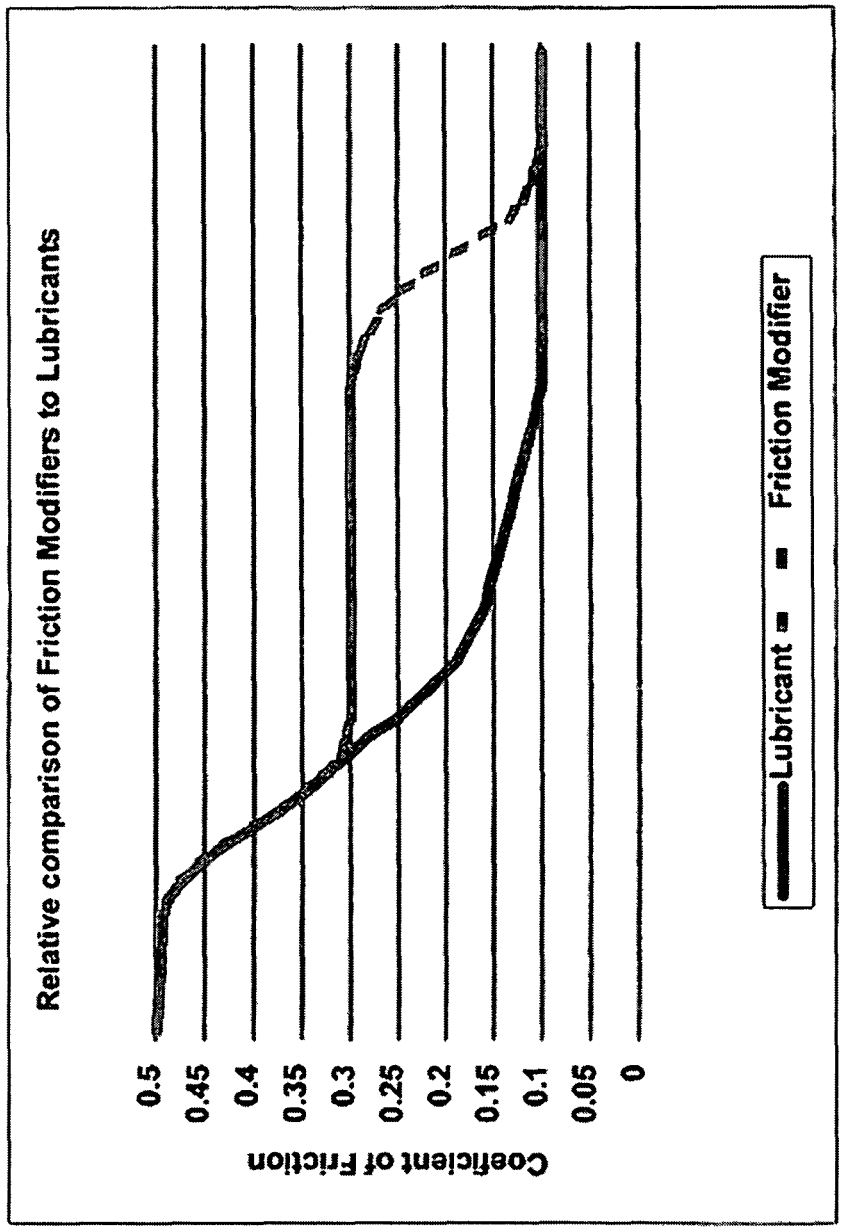
FIG. 1 shows the relationship between an application treatment of a component, or friction control composition applied to a steel surface, and the resulting co-efficient of friction between two steel surfaces. An application treatment may comprise, for example, but not limited to, a change in the application rate of the agent (component) or friction control composition, the amount of agent applied, the film thickness of agent applied, a change in the amount of an agent within a composition, or a change in the contaminant:composition ratio. Solid line: performance of a lubricant; Dashed line: performance of a friction modifier.

The present invention relates to friction control compositions for use on steel surfaces that are in sliding or rolling-sliding contact.

The following description is of a preferred embodiment.

The friction control compositions of the present invention generally comprise a lubricant, and a binder (also referred to as a retentivity agent). If a liquid formulation is desired, the friction control composition of the present invention may also comprise water or another composition-compatible solvent. Even though the compositions of the present invention, when comprising water or other compatible solvent, are effective for use within liquid formulations, the composition may be formulated into a paste or solid form and these compositions exhibit many of the advantages described herein. The compositions as described herein may also comprise wetting agents, dispersants, anti-bacterial agents, and the like as required. Furthermore, the friction control compositions of the present invention may comprise a rheological control agent, a consistency modifier, and a freezing point depressant. The friction control compositions of the present invention do not comprise a friction modifier, as defined herein.

The present invention provides a friction control composition that exhibits the property of friction control. The friction control composition comprises water, for example from about 40 to about 80 weight percent water, binder, for example, from about 1.0 to about 25 weight percent binder, lubricant, for example from 0 to about 10 weight percent lubricant; and optionally a rheological control agent, for example from about 0.5 to about 5 weight percent rheological control agent. The friction control composition may further comprise from an anti-oxidant, for example, 0 to about 5 weight percent anti-oxidant, a freezing point depressant, for example from 0 to about 25 weight percent freezing point depressant, or both an anti-oxidant and a freezing point depressant. The friction control composition may also comprise a wetting agent, an antibacterial agent, a consistency modifier, a defoaming agent, or a combination thereof. The friction control composition of the present invention does not comprise a friction modifier.

The composition of the present invention, or a component within the composition, exhibits the property of "friction control" or "controlling friction" when the co-efficient of friction between two surfaces is maintained at about 0.35±0.07, or at about 0.35±0.05, when the composition is applied over a range of amounts on the steel surface, for example, when applied at more than one application rate, when applied over a range of application rates, for example a two fold or greater change in the application rate, or when applied at a constant application rate, but the steel surface varies in a range of contaminants as is commonly the case in the field and that effectively dilute the composition, for example a 2 fold, or greater range in the amount of contaminants. For example which is not to be considered limiting, a composition that maintains the CoF from about 0.3 to about 0.45, or any amount therebetween, for example a CoF of 0.3, 0.32, 0.34, 0.36, 0.38, 0.40, 0.42, or 0.45, or more preferably, from about 0.3 to about 0.4, or any amount therebetween, for example a CoF of 0.3, 0.31, 0.32, 0.33, 0.34, 0.35, 0.36, 0.37, 0.38 0.39 or 0.40, when applied to a steel surface at more than one application rate, or when applied at a constant application rate to steel surface that exhibits a variation in the amount of contaminants, exhibits the property of friction control. Preferably, the CoF is maintained within the desired range of 0.35±0.07 or 0.35±0.05 over a 2, 3, 4, 5, 6, 7, 8, 9 or 10 fold, or greater, change (either an increase or decrease) in application rate, or a 2, 3, 4, 5, 6, 7, 8, 9 or 10 fold, or greater, change (either an increase or decrease) in a contaminant:composition ratio. More preferably, the CoF is maintained within the desired range of 0.35±0.07 or 0.35±0.05 over a 2, 3, 4 or 5 fold, or greater, change (either an increase or decrease) in application rate, or 2, 3, 4 or 5 fold, or greater, change (either an increase or decrease) in a contaminant:composition ratio.

Contaminants on a steel surface may include variable amounts of compounds including oil, miscellaneous solids, rust and corrosion including iron oxide, for example, $Fe_2O_3$, $Fe_3O_4$ or both, that form on a rail surface. For example, Broster et al (1974 Wear 29:309-321) report that levels of contamination vary from about 20 mg/cm$^2$×10$^{-3}$ to about 380 mg/cm$^2$×10$^{-3}$ along a rail depending upon whether it is a main or a branch line. The amount of rust and corrosion on branch lines is higher than that of a used main line. Variable amounts of debris, including iron oxide will affect the CoF of the steel surface. For example, the presence of iron oxide causes the CoF of the steel surface to increase to about 0.45-0.46, while the presence of oil may reduce the CoF to about 0.2. The use of the compositions of the present invention helps maintain the CoF between about 0.35±0.07 over a range in the amounts of contaminants, for example iron oxide, that may be present on the steel surface, or over a range of iron oxide:composition ratios.

The range of iron oxide:composition ratios over which the composition of the present invention exhibits the property of friction control, includes ratios where the amount of the composition exceeds that of iron oxide, for example an iron oxide: composition ratio from about 1:25 to about 1:1, or any ratio therebetween, for example 1:20, 1:15, 1:12, 1:10, 1:9, 1:8, 1:7, 1:6, 1:5, 1:4, 1:3, 1:2, or where a mixture of iron oxide and the composition of the present invention present on a steel surface, comprises 0%, 1%, 2%, 5%, 7%, 10%, 12%, 15%, 17%, 20%, 22%, 25%, 27%, 30%, 32%, 35%, 37%, 40%, 42%, 45%, 47% or 50% iron oxide with the remainder being the composition of the present invention. The range of iron oxide:composition ratios over which the composition of the present invention exhibits the property of friction control, also includes ratios where the amount of the iron oxide exceeds that of the composition, for example, an iron oxide: composition ratio from about 50:1 to about 1:1, or any ratio therebetween, for example 50:1, 49:1, 32:1, 24:1, 20:1, 19:1, 15:1, 13:1, 11:1, 10:1, 9:1, 8:1, 7:1, 6:1, 5:1, 4:1, 3:1, 2:1, or 1.5:1, or where a mixture of iron oxide and the composition of the present invention present on a steel surface comprises from about 2%, 5%, 7%, 10%, 12%, 15%, 17%, 20%, 22%, 25%, 27%, 30%, 32%, 35%, 37%, 40%, 42%, 45%, 47% or 50% the composition of the present invention, with the remainder being iron oxide.

The compositions of the present invention may be applied to a steel surface for example a rail at an application rate from about 10 ml/mile to about 2 L/mile (0.01 L/mile to 2 L/mile), or any amount therebetween, including but not limited to 0.01, 0.02, 0.05, 0.08, 0.1, 0.125, 0.15, 0.175, 0.2, 0.225, 0.25, 0.275, 0.3, 0.35, 0.4, 0.45, 0.5, 0.55, 0.6, 0.7, 0.8, 0.9, 1.0, 1.25, 1.5, 1.75, or 2.0 L/mile. For example, which is not to be considered limiting in any manner, the composition may be applied at an application rate of about 100 ml/mile (0.1 L/mile) forming a 5 cm wide path on the railhead. This application rate results in deposit of approx. 34×10$^{-3}$ mg/cm$^2$ of the dried composition on the railhead. Depending on the amount of iron oxide or other contaminants on the rail surface (e.g. from about 20 mg/cm$^2$×10$^{-3}$ to about 380 mg/cm$^2$×10$^{-3}$; Broster et al., 1974, Wear 29:309-321), this equates to a mixture of iron oxide and the composition of the present invention comprising about 36 to about 75 wt % of iron oxide (the remainder being the composition of the present invention) on main rail lines, and about 88% to about 92 wt % iron oxide, with the remainder of the mixture comprising the composition of the present invention, on branch lines.

The co-efficient of friction may be measured using any suitable devise for example a push tribometer, or TriboRailer (H. Harrison, T. McCanney and J. Cotter (2000), Recent Developments in COF Measurements at the Rail/Wheel Interface, Proceedings The 5th International Conference on Contact Mechanics and Wear of Rail/Wheel Systems CM 2000 (SEIKEN Symposium No. 27), pp. 30-34, which is incorporated herein by reference).

By the term 'positive friction characteristic', it is meant that the coefficient of friction (CoF) between two surfaces in sliding or rolling-sliding contact increases as the creepage between the two surfaces increases. The term 'creepage' is a common term used in the art and its meaning is readily apparent to someone of skill in the art. For example, in the railroad industry, creepage may be described as the percentage difference between the magnitude of the velocity of the sliding movement of a rail relative to the magnitude of the tangential velocity of the wheel at the point of contact between wheel and rail, assuming a stationary zone of contact and a dynamic rail and wheel.

Various methods in the art may be used to determine if a friction control composition exhibits a positive friction characteristic. For example, but not wishing to be limiting, in the lab a positive friction characteristic may be identified using a disk rheometer or an amsler machine ((H. Harrison, T. McCanney and J. Cotter (2000), Recent Developments in CoF Measurements at the Rail/Wheel Interface, Proceedings The 5th International Conference on Contact Mechanics and Wear of Rail/Wheel Systems CM 2000 (SEIKEN Symposium No. 27), pp. 30-34, which is incorporated herein by reference). Other two roller systems may be used to determine frictional control characteristics of compositions (e.g. A. Matsumo, Y. Sato, H. Ono, Y. Wang, M. Yamamoto, M. Tanimoto and Y. Oka (2000), Creep force characteristics between rail and wheel on scaled model, Proceedings The 5th International Conference on Contact Mechanics and Wear of Rail/Wheel Systems CM 2000 (SEIKEN Symposium No. 27), pp. 197-202; which is incorporated herein by reference). Sliding friction characteristics of a composition in the field, may be determined using for example but not limited to, a push tribometer.

Wheel squeal associated with a curved track may be caused by several factors including wheel flange contact with the rail gauge face, and stick-slip due to lateral creep of the wheel across the rail head. Without wishing to be bound by theory, lateral creep of the wheel across the rail head is thought to be the most probable cause of wheel squeal, while wheel flange contact with the rail gauge playing an important, but secondary role. Studies, as described herein, demonstrate that different friction control compositions may be applied to different faces of the rail-wheel interface to effectively control wheel squeal. For example, a composition with a positive friction characteristic as is known in the prior art, for example WO 02/26919 (which is incorporated herein by reference), or a composition of the present invention exhibiting friction control, may be applied to the head of the rail-wheel interface to reduce lateral slip-stick of the wheel tread across the rail head, and a low friction control composition, or a composition of the present invention exhibiting friction control, may be applied to the gauge face of the rail-wheel flange to reduce the flanging effect of the lead axle of a train car.

The relationship between a treatment variable, for example the rate of application of a friction control composition, the amount of an ingredient within a friction control composition, or a contaminant:composition ratio, for example the iron oxide:composition ratio, and coefficient of friction may be compared to determine an effective application rate of the composition, or an effective range of iron oxide:composition ratios that results in maintaining a desired range of in the CoF. This relationship is shown conceptually in FIG. 1, where a CoF of 0.3 is maintained over a range in the treatment variable (X-axis) using a conceptual friction modifier. An application treatment may comprise, for example, but not limited to, a change in the application rate of the agent or friction control composition (e.g. the amount of agent applied, the film thickness of agent applied), a change in the amount of the active component that exhibits friction control within a composition, or a change in the contaminant:composition ratio, or iron oxide:composition ratio as a result of changes to the amount of iron oxide present on the steel surface.

A friction control composition, or a component within the composition that exhibits friction control (as defined above) and produces a CoF value from about 0.3 to about 0.45 (or any amount therebetween) over a narrow range of the application rate of treatment variable, is less desirable than an agent or composition that provides the same range of CoF but over a wider range of the treatment variable. The component or composition that results in a CoF of for example 0.35±0.07 over a wider range in the application rate, film thickness, or contaminant:composition ratio, for example over a two fold or greater change in the treatment variable permits greater flexibility in application rate to maintain the desired CoF. For example, with reference to FIG. 1, the range of the treatment variable (X-axis) for "lubricant" that results in a CoF between 0.3 and 4.5 is much less that that of "friction modifier". It is therefore desirable to develop friction control compositions that are characterized as producing a CoF between about 0.3 to 0.45 or 0.35±0.07, over a wide a range of the treatment variable, for example the application rate, film thickness, or contaminant:composition ratio, and that exhibit a "plateau" resulting from a similar CoF over a range of the treatment variable. For example, the friction control composition of FIG. 2b exhibits a CoF between 0.3 and 0.45 over a treatment variable range, in this case a mixture comprising from about 8 wt % to 100 wt % binder (92 wt % to 0 wt % of iron oxide; see Example 2 for details) in the friction control composition.

Prior art friction control compositions comprise friction modifiers to impart the property of friction control between steel surfaces to the composition. Typical, prior art friction modifiers include calcium or magnesium carbonate, magnesium silicate, calcium sulphate, asbestos, aluminium silicate, silica, zinc stearate, aluminium stearate, magnesium carbonate, lead oxide, zinc oxide, antimony oxide, aluminium oxide, magnesium oxide; and zirconium oxide, see for example, U.S. Pat. Nos. 5,308,516, 5,173,204, WO 02/26919, US Publications 2003 0195123 and 2004 038831. However, it has been observed in the present invention, that binders (retentivity agents) exhibit the property of a friction control, and in the absence of a friction modifier, a binder may control the coefficient of friction between steel surfaces. Compositions comprising binders that do not contain a friction modifier may be used to control the coefficient of friction between steel surfaces (see for example, Example 2). Furthermore, in addition to the property of friction control, binders also exhibit the property of increasing the retentivity of a friction control composition on a steel surface (see Example 3).

Retentivity may be defined as the duration a friction control composition is able to maintain a CoF value of 0.3±0.07 between two steel surfaces. However, other variables for expressing retentivity may also be considered, and retentivity may also be defined in terms of, for example but not limited to, the duration of maintaining a drawbar force, or lateral force, at a desired, or reduced amount. Retentivity may be expressed in units of time, for example how long a friction control composition exhibits the desired property under a constant experimental condition (e.g. determined using the amsler machine), by removal rate, or in terms of number of axel passes. In practice, retentivity may refer to the number of axle passes for which the applied composition remains effective to give a CoF value of 0.3±0.07.

Retentivity of a composition may be determined using an amsler machine or other suitable device and noting the number of cycles that an effect is maintained. Furthermore, in the railroad industry retentivity may be measured as a function of the number of axle passes for which a desired effect, such as, but not limited to sound reduction, drawbar force reduction, lateral force reduction, or frictional level, is maintained, or by using a push tribometer.

By the term 'binder', also referred to as "retentivity agent", it is meant a chemical, compound, or a combination of compounds, which increases the effective lifetime of operation, the durability, or retentivity, of a friction control composition between two or more surfaces is sliding-rolling contact. A binder may provide, or increase film strength and adherence of the composition to a substrate. Preferably a binder is capable of associating with components of the friction composition and form a film on the surface to which it is applied, thereby increasing the durability of the composition on the surface exposed to steel-to-steel contact.

Furthermore, as described herein, it has been noticed that binders with lower glass transition temperature (Tg) exhibit an increase in retentivity of the composition when applied to a steel surface. The Glass transition temperature (Tg) is defined as the temperature at which a compound, for example an amorphous polymer (or the amorphous regions in a partially crystalline polymer), changes from a hard and relatively brittle condition to a viscous or rubbery condition. Polymers with a lower Tg exhibit higher retentivity that polymers with a higher Tg (see FIG. 4; Tables 2 and 3, Example 4). For example, as described in more detail in Example 4, the binder AQUAZOL™ 50/500 is characterized as having a Tg of 69° C., and a retentivity of about 90%, compared to the reference binder, RHOPLEX™ AC-264 (having a retentivity of about 100% and a Tg of 16° C.). Other polymers having a Tg less than that of RHOPLEX™ AC-264, and greater retentivity, include but are not limited to, styrene acrylates, carboxylated styrene butadienes, acrylic-urethanes, poly vinylacetate-vinylchloride ethylenes, cross-linked epoxies, and epoxies.

It is preferable that a binder has the ability to bind the lubricant components so that these components form a thin layer and resist displacement from the wheel-rail contact patch. Furthermore it is preferred that a binder exhibit the property of friction control as defined herein. It is also preferable that binders maintain physical integrity during use and are not burned off during use. Suitable binders exhibit a high solids loading capacity, reduced viscosity, and if desired a low minimum film foaming temperature. Examples of binders, include but are not limited to:

acrylics, for example but not limited to, RHOPLEX™ AC 264RHOPLEX™ MV-23LO or MAINCOTE™ HG56 (Rohm & Haas);

polyvinyls, polyvinyl alcohol, polyvinyl chloride, poly(vinylacetate vinylchloride ethylene), or a combination thereof, for example, but not limited to, AIRFLEX™ 728 (Air Products and Chemicals), EVANOL™ (Dupont), ROVACE™ 9100, or ROVACE™ 0165 (Rohm & Haas);

oxazolines, for example, but not limited to, AQUAZOL™ 50/500 (Polymer Chemistry);

styrene butadiene compounds (carboxylated styrene butadiene), for example for example but not limited to, DOW LATEX (DL) 226 ™& 240 ™ (Dow Chemical Co.);

styrene acrylate, for example but not limited to, ACRONAL™ S 760 (BASF), RHOPLEX™ E-323LO RHOPLEX™ HG-74P (Rohm & Hass), EMULSION™ E-1630, E-3233 (Rohm & Hass);

epoxies or cross linked epoxies, comprising a two part system of a resin and a curing agent. Choice of resin may depend upon the solvent used for the friction control composition. For example, which is not to be considered limiting, in aqueous formulations suitable resin include water borne epoxies, such as, ANCAREZ™ AR 550 (2,2'-(1-methylethylidene) bis(4,1-phenyleneoxymethylene) bisoxirane homopolymer; Air Products and Chemicals), EPOTUF™ 37-147 (Bisphenol A-based epoxy; Reichhold), or crosslinked ANCAREZ™ AR550. An amine or amide curing agents, for example, but not limited to ANQUAMINE™ 419, 456 and ANCAMINE™ K54 (Air Products and Chemicals) may be used with aqueous epoxy formulations. However, increased retentivity has been observed when an epoxy resin, in the absence of a curing agent is used alone. Preferably, the epoxy resin is mixed with a curing agent during use. Other components that may be added to the composition include hydrocarbon resins that increase the adhesion of the composition to contaminated surfaces, for example, but not limited to, EPODIL™-L (Air Products Ltd.) If an organic based solvent is used, then non-aqueous epoxy resins and curing agents, may be used;

alkyd, modified alkyds;
acrylic latex;
acrylic epoxy hybrid;
urethane acrylic;
polyurethane dispersions;
various gums and resins; and a combination thereof.

Properties of an epoxy (a two part system) may be modulated by varying the amount of resin or curing agent within the epoxy mixture. For example, which is described in more detail below, increased retentivity of a friction control composition comprising an epoxy resin and curing agent, is observed in compositions comprising from about 1 to about 50 wt % epoxy resin. Preferably, the composition comprises from about 2 to about 20 wt % epoxy resin. Furthermore, increasing the amount of curing agent, relative to the amount of resin, for example, but not limited to 0.005 to about 0.8 (resin:curing ratio), may also result in increased retentivity. Furthermore, friction control compositions comprising epoxy resin in the absence of curing agent, also exhibit high retentivity. Without wishing to be bound by theory, it is possible that without a curing agent the applied epoxy film maintains an elastic quality allowing it to withstand high pressures arising from steel surfaces in sliding and rolling contact.

A solvent may also be required so that the friction modifying compositions of the present invention may be mixed and applied to a substrate. The solvent may be either an organic or an aqueous depending upon the application requirements, for example, cost of composition, required speed of drying, environmental considerations etc. Organic solvents may include, but are not limited to, methanol, however, other solvents may be used to reduce drying times of the applied composition, increase compatibility of the composition with contaminated substrates, or both decrease drying times and increase compatibility with contaminated substrates. Preferably the solvent is water. In a water-borne system the binder may not truly be in a solution with the solvent, but instead is a dispersion in the composition.

By the term 'consistency modifier' it is meant any material that allows the friction control compositions of the present invention to be formulated with a desired consistency. Examples of the consistency modifier include, without limitation, glycerine, alcohols, glycols such as propylene glycol or combinations thereof. In addition, the consistency modifier may alter other properties of the friction control compositions, such as the low temperature properties of the compositions, and function in some degree as a freezing point depressant, thereby allowing the friction control compositions of the present invention to be formulated for operation under varying temperatures.

By the term 'freezing point depressant' it is meant any material that when added to the composition of the present invention results in a reduction in the freezing point of the composition relative to that of the same composition lacking the freezing point depressant for example by reducing the freezing point of the composition by at least 1° C., or by at least 10° C., or by at least 15° C., or an amount therebetween, relative to that of the same composition lacking the freezing point depressant. EP 1418222 (which is incorporated herein by reference) discloses examples of freezing point depressants that may be used in accordance with the present invention. A freezing point depressant may be added to the composition of the present invention in addition to a consistency modifier. A non-limiting example of a composition comprising a binder and a freezing point depressant is provided in Example 12 (Tables 12a, 12b and 13).

A non-limiting example of the freezing point depressant includes a glycol, such as propylene glycol, or a glycol ether, more particularly, a propylene glycol ether, or an ethylene glycol ether, such as and without limitation to Dowanol® EB (ethylene glycol butyl ether). The freezing point depressant may also be selected from the group consisting of dipropylene glycol methyl ester, dipropylene glycol dimethyl ether, dipropylene glycol monopropyl ether, propylene glycol tertiary butyl ether, propylene glycol normal propyl ether, dipropylene glycol monopropyl ether, propylene glycol methyl ether acetate, propylene glycol methyl ether acetate, and ethylene glycol butyl ether. However, it is to be understood that this group is to be considered non-limiting.

The freezing point depressant can also be a salt, for example, betaine HCl, cesium chloride, potassium chloride, potassium acetate, sodium acetate, potassium chromate, sodium chloride, sodium formate, or sodium tripolyphosphate.

Furthermore, the freezing point depressant can be a composition comprising a metal acetate, such as potassium acetate or sodium acetate. Examples of such compositions include without limitation, CRYOTECH® E36, which comprises potassium acetate, and CRYOTECH® NAAC, which comprises sodium acetate.

The freezing point depressant may also be an acid, such as, citric acid, lactic acid, or succinic acid, a heterocyclic amine, such as nicotinamide, an aryl alcohol, such as phenol, an amino acid, an amino acid derivative, such as trimethyl glycine, or a carbohydrate, such as D-(+)-xylose.

By the term 'lubricant' it is meant a chemical, compound or mixture thereof that is capable of reducing the coefficient of friction between two surfaces in sliding or rolling-sliding contact. Lubricants include but are not limited to molybdenum disulfide, graphite, aluminum stearate, zinc stearate and carbon compounds such as, but not limited to coal dust, and carbon fibres. Preferably, the lubricants, if employed, in the compositions of the present invention are molybdenum disulfide, graphite and Teflon TEFLON™ (polytetrafluoroethylene).

The compositions of the present invention may comprise a lubricant at an amount that results in the composition being characterized as comprising a coefficient of friction of from about 0.3 to about 0.45, or any amount therebetween, for example, a composition of the present invention may comprise from about 0 to about 3 wt %, or an amount therebetween, including but not limited to 0, 0.2, 0.3, 0.4, 0.5, 0.6, 0.7, 0.8, 0.9, 1.0, 1.2, 1.4, 1.6, 1.8, 2.0, 2.2, 2.4, 2.6, 2.8, or 3.0 wt % of lubricant. Preferably, the amount of lubricant in the composition is from about 0 to about 1 wt %, or an amount therebetween.

By the term 'antioxidant', it is meant a chemical, a compound or combination thereof that either in the presence or absence of a binder (retentivity agent) increases the amount of friction control composition retained on the surfaces thereby resulting in an increase in the effective lifetime of operation or durability of the friction control compositions. Antioxidants include but are not limited to:

amine type antioxidants, for example but not limited to WINGSTAY® 29;
styrenated phenol type antioxidants, for example but not limited to WINGSTAY S®;
hindered type antioxidants, for example but not limited to WINGSTAY® L;
thioester type antioxidants (also known as secondary antioxidants), for example but not limited to Wingstay WINGSTAY® SN-1; or
combinations thereof, for example but not limited to:
synergistic blends comprising a hindered phenol and a thioester, for example but not limited to OCTOLITE® 424-50.

Preferred antioxidants are WINGSTAY® S, WINGSTAY® L, and WINGSTAY® SN-1 (Goodyear Chemicals), and OCTOLITE® 424-50(Tiarco Chemical).

The friction control compositions of the present invention may also include other components, such as but not limited to preservatives, wetting agents, consistency modifiers, and rheological control agents, either alone or in combination.

By the term 'rheological control agent' it is meant a compound capable of absorbing liquid, for example but not limited to water, and physically swell. A rheological control agent may also function as a thickening agent, and help keep the components of the composition in a dispersed form. This agent functions to suspend active ingredients in a uniform manner in a liquid phase, and to control the flow properties and viscosity of the composition. This agent may also function by modifying the drying characteristics of a friction control composition. Furthermore, the rheological control agent may provide a continuous phase matrix capable of maintaining the solid lubricant in a discontinuous phase matrix. Rheological control agents include, but are not limited RHEOLATE® 244 (a urethane); caseine; carboxymethylcellulose (CMC, e.g. CELFLOW®); carboxy-hydroxymethyl cellulose; a substituted cellulose compound comprising anhydroglucose units that are each substituted with a substituent selected from the group consisting of a methyl group, a hydroxypropyl group, a hydroxyethyl group, and a mixture thereof; ethoxymethylcellulose, chitosan, a starch, and a mixture thereof. Non-limiting examples of substituted cellulose compounds include MECELLOSE® PMC-40H1 (hydroxypropyl methylcellulose), or cellulose compounds comprising anhydroglucose units include METHOCEL® (Dow Chemical Company), METOLOSE® (ShinEtsu), MECELLOSE® HPMC (Samsung), and HBR (an hydroxyethylcellulose). A preferred rheological control agent is MECELLOSE® PMC-40H1.

In a preferred embodiment, the rheological control agent is a substituted cellulose compound comprising anhydroglucose units that are each substituted with a substituent selected from the group consisting of a methyl group, a hydroxypropyl group, a hydroxyethyl group, and a mixture thereof. In another preferred embodiment, each of the anhydroglucose units of the substituted cellulose compound is substituted by an average of about 1.3 to about 1.9 substituents.

Examples of preservatives include, but are not limited to ammonia, alcohols or biocidal agents, for example but not limited to OXABAN A™ (Dimethyl Oxazolidine). An example of a defoaming agent is COLLOIDS 648™. The amount of preservative to be used may be readily determined by one of skill in the art.

A wetting agent, which may be included in the compositions of the present invention includes, but is not limited to, nonyl phenoxypolyol, or CO-630™ (Union Carbide). The wetting agent may facilitate the formation of a water layer around the lubricant and friction control particles with the lubricant. It is well known within the art that wetting agents reduce surface tension of water and this may facilitate penetration of the friction control composition into cracks of the surfaces that are in sliding or rolling-sliding contact. Further, a wetting agent may aid in the dispersion of the binder in the liquid friction control composition. The wetting agent may also be capable of emulsifying grease, which may be present between surfaces in sliding and rolling-sliding contact, for example, but not wishing to be limiting surfaces such as a steel-wheel and a steel-rail. The wetting agent may also function by controlling dispersion and minimizing agglomeration of solid particles within the composition.

It is also possible that a single component of the present invention may have multiple functions. For example, but not wishing to be limiting, alcohol may be used as a preservative and it may also be used as a consistency modifier to modulate the viscosity of the friction control composition of the present invention. Alcohol may be used as a preservative and also be used to lower the freezing point of the friction control compositions of the present invention. The binder may be used to increase the retentivity of the composition on a steel surface, and also exhibit friction control activity.

There are several methods of applying a water-based product to the top of the rail. For example which are not to be considered limiting, such methods include: onboard, wayside or hirail system. An onboard system sprays the liquid from a tank (typically located after the last driving locomotive) onto the rail. The wayside, is an apparatus located alongside the track that pumps product onto the rail after being triggered by an approaching train. A hirail is a modified pickup truck that has the capability of driving along the rail. The truck is equipped with a storage tank (or tanks), a pump and an air spray system that allows it to apply a thin film onto the track. The hirail may apply compositions when and where it is needed, unlike the stationary automated wayside. Only a few hirail vehicles are required to cover a large area, whereas the onboard system requires that at least one locomotive per train be equipped to dispense the product.

The compositions of the present invention may be applied to metal surfaces such as rail surfaces or couplings by any method known in the art. For example, but not wishing to be limiting, the compositions of the present invention may be applied as a solid composition, or as a bead of any suitable diameter, for example about one-eighth of an inch in diameter. However, in certain instances it may be preferable for the liquid friction control compositions to be applied using a brush or as a fine atomized spray. The bead method may have the potential disadvantage that under some circumstances it may lead to wheel slip, possibly because the bead has not dried completely. A finely atomized spray may provide for faster drying of the composition, more uniform distribution of the material on top of the rail and may provide for improved lateral force reduction and retentivity. An atomized spray application of the liquid friction control compositions of the present invention may be preferable for on-board transit system application, on-board locomotive application and hirail vehicle application, but the use of atomized spray is not limited to these systems. However, as someone of skill in the art will understand, some compositions of the present invention may not be ideally suited for application by atomized spray, such as liquid friction control compositions contemplated by the present invention which are highly viscous.

Atomized spray application is also suitable for applying combinations of liquid friction control compositions of the present invention to different areas of the rail for optimizing the interactions between the rail-wheel interface. It is also possible to apply one frictional modifier of the present invention as a atomized spray, for example to the gauge face of the rail, with a second frictional modifier applied as a bead or as a solid stick on the rail head.

Liquid friction control compositions according to the present invention which are contemplated to be applied as an atomized spray preferably exhibit characteristics, such as, but not limited to a reduction of course contaminants which may lead to clogging of the spray nozzles of the delivery device, and reduction of viscosity to ensure proper flow through the spray system of the delivery device and minimize agglomeration of particles. Materials such as, but not limited to, bentonite may comprise coarse particles which clog nozzles with small diameters. However, materials of a controlled, particle size, for example but not limited to particles of less than about 50 μM may be used for spray application.

Alternatively, but not to be considered limiting, the liquid friction control compositions of the present invention may be applied through wayside (trackside) application, wherein a wheel counter may trigger a pump to eject the composition of the present invention through narrow ports onto the top of a rail. In such an embodiment, the unit is preferably located before the entrance to a curve and the material is distributed by the wheels down into the curve where the composition of the current invention may reduce noise, lateral forces, the development of corrugations, or combination thereof.

Specific compositions of the liquid friction control compositions of the current invention may be better suited for wayside application. For example, it is preferable that compositions for wayside application dry by forming a light skin on the surface without thorough drying. Compositions which dry "through" may clog nozzle ports of the wayside applicator and be difficult to remove. Preferably, liquid friction control compositions for wayside application comprise a form of carboxymethylcellulose (CMC) in place of bentonite as the binder.

The liquid friction control compositions of the current invention preferably dehydrate following application onto a surface, and prior to functioning as a friction control composition. For example, but not wishing to be limiting, compositions of the present invention may be painted on a rail surface prior to the rail surface engaging a wheel of a train.

The water, and any other liquid component in the compositions of the present invention may evaporate prior to engaging the wheel of a train. Upon dehydration, the liquid friction control compositions of the present invention preferably form a solid film that enhances adhesion of the other components of the composition. Thus, the liquid friction control compositions of the present invention are specifically contemplated to undergo dehydration prior to acting as friction control compositions. However, in certain applications contemplated by the present invention, the liquid friction control compositions of the present invention may be sprayed directly onto the rail by a pump located on the train or alternatively, the compositions may be pumped onto the rail following the sensing of an approaching train. Someone of skill in the art will appreciate that frictional forces and high temperatures associated with the steel-wheel traveling over the steel-rail may generate sufficient heat to rapidly dehydrate the composition.

The friction control compositions of the current invention may be applied to the steel surface in multiple layers. A subsequent layer is applied upon dehydration of a previous layer, the liquid friction control compositions of the present invention to form a solid film comprising several layers of films. This layering may enhance adhesion of the other components of the composition to the surface.

The surface of the rail may form a film of rust or iron oxide ($Fe_2O_3$). Therefore, the compositions as described herein may be manipulated to comprise varying amounts of iron oxide to simulate the condition of a rail track.

A benefit associated with the use of the friction control compositions of the present invention is the reduction of lateral forces associated with steel-rail and steel-wheel systems of freight and mass transit systems. The reduction of lateral forces may reduce rail wear (gauge widening) and reduce rail replacement costs. Lateral forces may be determined using a curved or tangential track rigged with appropriate strain gauges.

Another benefit associated with the use of the friction control compositions of the present invention is the reduction of energy consumption as measured by, for example but not limited to, drawbar force, associated with steel-rail and steel-wheel systems of freight and mass transit systems. The reduction of energy consumption has an associated decrease in operating costs.

The friction modifier compositions of the present invention may further comprise components that one of skill in the art will appreciate may be substituted or varied without departing from the scope and spirit of the present invention. In addition, it is fully contemplated that the friction modifier compositions of the present invention may be used in combination with other lubricants or friction control compositions. For example, but not wishing to be limiting, the compositions of the current invention may be used with other friction control compositions such as, but not limited to those disclosed in U.S. Pat. Nos. 5,308,516; 5,173,204; WO 02/26919, and US Publication 2003 0195123 and 2004 038831.

Furthermore, the friction control compositions of the present invention may be applied to the rail-head while a composition which decreases the coefficient of friction may be applied to the gauge face or the wheel flange.

The present invention will be further illustrated in the following examples. However, it is to be understood that these examples are for illustrative purposes only, and should not be used to limit the scope of the present invention in any manner.

EXAMPLE 1

Characterization of Liquid Friction Control Compositions

Amsler Protocol

Retentivity may be tested using the Amsler machine. This device simulates the contact between the wheel of a train and the rail, and measures the coefficient of friction between the two bodies over time. The Amsler machine uses two different discs to simulate the wheel and rail. The two discs are kept in contact by an adjustable spring at a constant force. A composition is applied to a clean disc in a controlled manner to produce a desired thickness of coating on the disc. For the analysis disclosed herein the compositions are applied using a fine paint brush to ensure complete coating of the disc surface. The amount of applied composition is determined by weighing the disc before and after application of the composition. Composition coatings range from 2 to 12 mg/disc. The composition is allowed to dry completely prior to testing, typically for at least an 8 hour period.

The discs are loaded onto the Amsler machine, brought into contact and a load is applied from about 680 to 745 N, in order to obtain a similar Hertzian Pressure (MPa) over different creep levels resulting from the use of different diameter disc combinations. Unless otherwise indicated, tests are performed at 3% creep level (disc diameters 53 mm and 49.5 mm). For all disc size combinations (and creep levels from 3 to 30%) the speed of rotation is 10% higher for the lower disc than the upper disc. The coefficient of friction is determined using a computer from the torque measured by the Amsler machine. The test is carried out until the coefficient of friction reaches 0.4, and the number of cycles or seconds determined for each tested composition.

Standard Manufacturing Process for friction modifier compositions:

1) To about half of the water, add the full amount of rheological agent and allow the mixture to disperse for about 5 minutes;
2) Add wetting agent if present, for example but not limited to CO-630™, and allow to disperse for about 5 minutes;
3) Add defoaming agent, for example but not limited to COLLOIDS 675®, and neutralizing agent, if present, for example but not limited to AMP-95® (2-Amino-2-methyl-1-propanol), and allow mixture to disperse;
4) Add lubricant, if present, in small amounts, allowing each addition to completely disperse prior to making subsequent additions;
5) Allow mixture to disperse for 5 minutes.
6) Remove sample from the vat and if desired, perform viscosity, specific gravity and filtering tests and adjust ingredients to meet desired specifications;
7) Decrease the speed of the dispenser and add binder (retentivity agent), consistency agent, freezing point depressant (if present), and preservative. Optionally, any wetting agent and defoaming agent not added previously may be added and allowed to disperse;
8) Add remaining water and mix thoroughly.

EXAMPLE 2

Characterization of Simplified Friction Control Compositions

Composition Comprising Lubricant Plus Friction Modifier

Simplified compositions comprising a lubricant (molybdenum disulfide or graphite), with or without a prior art friction modifier (talc), and varying amount of iron oxide (to simulate the surface of a rail) were prepared in water, applied to the surface of a rail, dried, and the coefecient of friction (sliding CoF) determined using a push tribometer (H. Harrison, T. McCanney and J. Cotter (2000), Recent Developments in CoF Measurements at the Rail/Wheel Interface, Proceedings The 5th International Conference on Contact Mechanics and Wear of Rail/Wheel Systems CM 2000 (SEIKEN Symposium No. 27), pp. 30-34, which is incorporated herein by reference). The compositions comprised from 40 wt % to 98 wt % iron oxide in place of the lubricant or the lubricant and friction modifier (talc). No binder was included in these compositions.

Varying the amount of iron oxide in the composition also simulates varying the application rates of the composition, where low amounts of iron oxide (40 wt %) simulate a high application rate of the composition, and high amount of iron oxide (98 wt %) simulates low rates of application. The results are present in FIG. 2a.

Figure 2A:
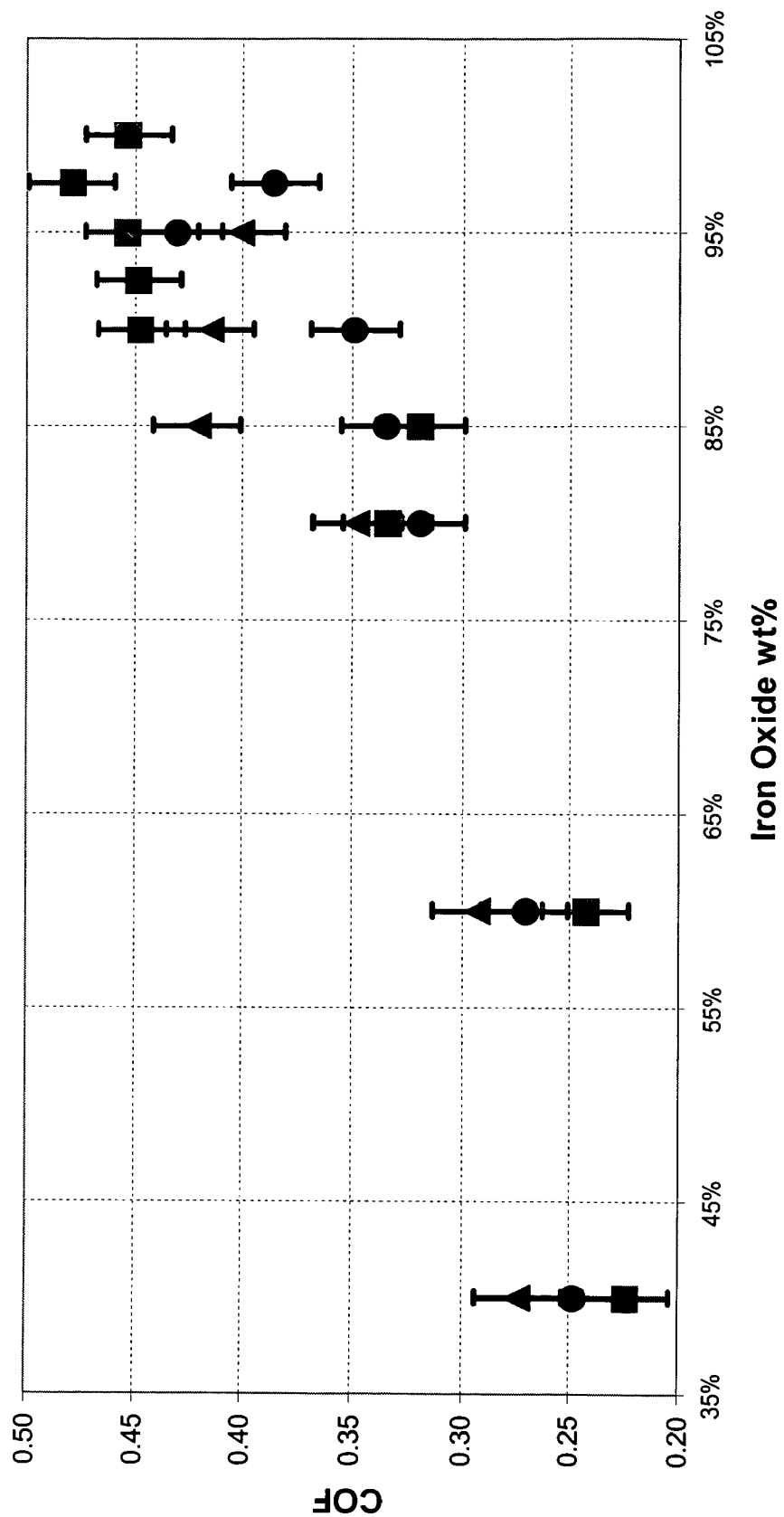
FIG. 2a shows the change in the coefficient of friction over a range of contaminant:composition ratios, where the contaminant is iron oxide, and the compositions comprise a lubricant (■: molybdenum disulfide; ●: graphite) or a lubricant and a friction modifier (▲: molybdenum disulfide and Talc). None of these compositions comprise a film forming binder.

The results shown in FIG. 2a show that in the absence of a friction modifier the CoF of a lubricant in presence of 40-60% iron oxide is about 0.23-0.27, and at high amount of iron oxide (90-100%), the CoF is greater than about 0.4. These results also show that the range of the amount of iron oxide (equivalent to simulating the application rates) for compositions comprising a lubricant (molybdenum disulfide or graphite) that results in a coefficient of friction between 0.3 to 0.45 is over an amount of iron oxide from 75%-95%. This is less than the range of applications rates for a composition comprising lubricant (molybdenum disulfide) and a friction modifier, which range from an amount of iron oxide from 65%-95%.

These results indicate that in the presence of a friction modifier, the range in the application of the friction composition that result in the desired window of CoF is broader than in a composition lacking the friction modifier. The use of such a composition could be applied over a range of application rates, and would require lower frequency intervals of re-application, compared to the lubricant-only composition. However, for each of the above compositions, the decrease in the CoF with changing application rate was constant, and no distinct "plateau" could be observed (FIG. 2a).

Composition Comprising Binder (Retentivity Agent)

A similar experiment using simplified compositions comprising a varying amount of a binder, for example RHOPLEX™ AC-264 and varying amounts of iron oxide (to simulate the surface of a rail) were prepared in water, applied to the surface of a rail, dried, and the coeffecient of friction (sliding CoF) determined as above, using a push tribometer. The compositions comprised from 0 wt% to 100 wt% iron oxide in place of binder. These compositions did not comprise a friction modifier. Varying the amount of iron oxide in the composition simulates varying the application rates of the composition, with low amounts of iron oxide simulating a high application rate of the composition, and high amount of iron oxide simulating low rates of application. The results are shown in FIG. 2b.

Figure 2B:
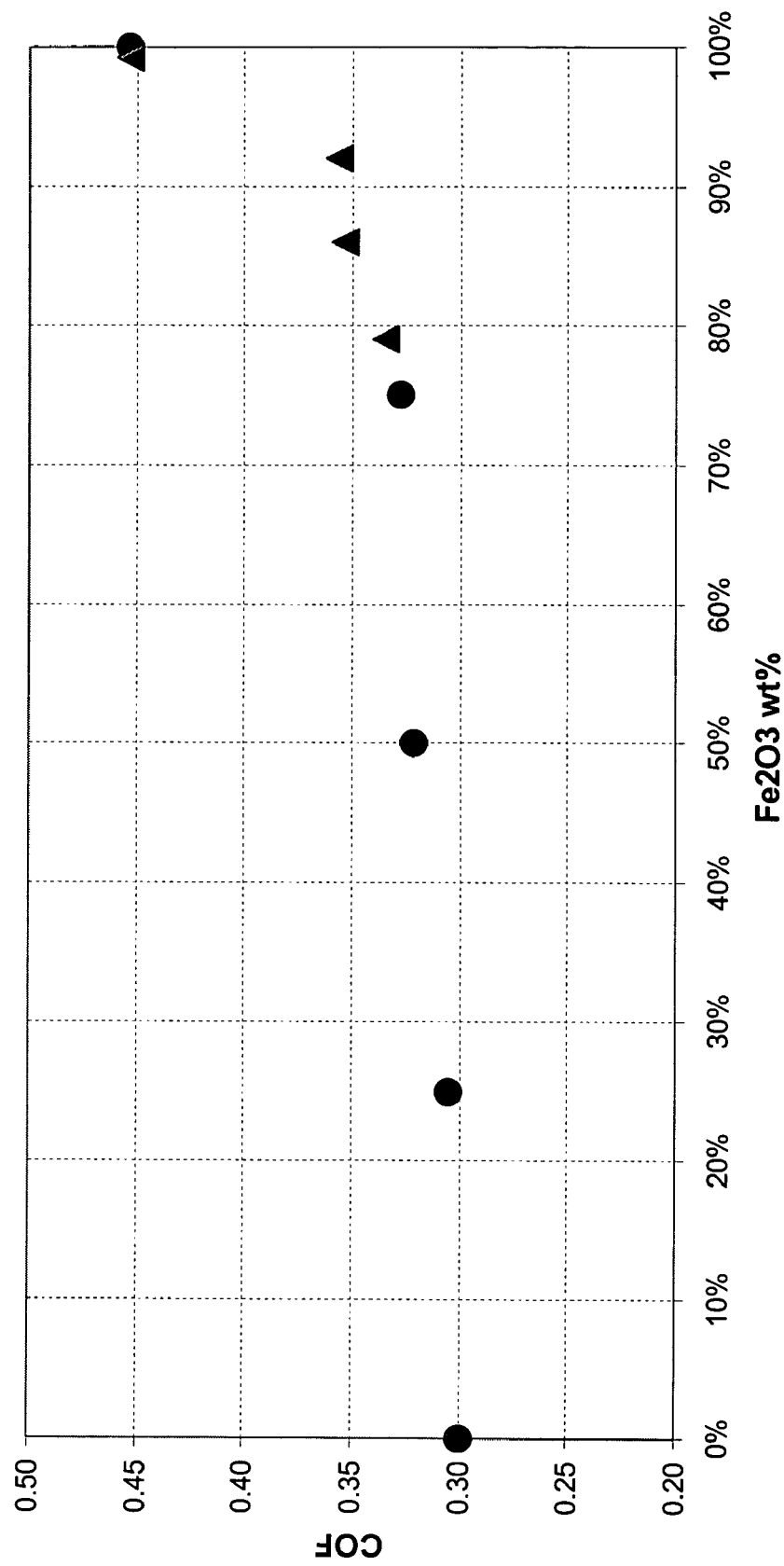
FIG. 2b shows the change in the coefficient of friction over a range of iron oxide:composition ratios in compositions comprising a film forming binder (RHOPLEX™ AC-264; ●: a composition comprising binder and iron oxide was mixed and applied to the steel surface; ▲: iron oxide was applied to the steel surface and allowed to dry, followed by application of the binder).

In the absence of binder (100 wt% iron oxide) the CoF is 0.45 (FIG. 2b). Increasing the amount of the binder (RHOPLEX™ AC-264) in the composition to 100 wt% (0 wt% iron oxide) reduces the CoF to 0.3.

Furthermore, a wide range in the rate of application of the binder, from about 2 wt % to 100 wt % binder (i.e. 0 to about 98 wt % iron oxide, or up to a iron oxide:composition ration of about 49:1) is able to maintain the CoF between 0.3 and 0.4. The same result is observed if the iron oxide layer is applied onto the rail surface and dried before applying the binder to the treated rail surface, or if the iron oxide is mixed with the binder and applied to the rail surface.

This broad "plateau" noted in the range in the amount of iron oxide present in the mixture of from 0 to about 98 wt% that results in a CoF between 0.3 to 0.4 indicates that a broader range of application rates of a composition comprising a binder (retentivity agent) may be used to obtain a desired CoF, when compared to a friction modifier (65 wt%-95 wt%; FIG. 2a). These results also show that an effective CoF of 0.3±0.05 may be obtained over a range of rust conditions (simulated by iron oxide) of the rail using a binder. Substitution of RHOPLEX™ AC-264 with other binders, for example acrylics (RHOPLEX™ AC 264, RHOPLEX™ MV-23LO or MAINCOTE™ HG56), polyvinyls, polyvinyl alcohol, poly (vinylacetate vinylchloride ethylene), polyvinyl chloride, (AIRFLEX™ 728, EVANOL™, ROVACE™ 9100, or ROVACE™ 0165, oxazolines (AQUAZOL™ 50/500), styrene butadiene compounds (DOW LATEX 226™ & 240™), styrene acrylate (ACRONAL™ S 760, RHOPLEX™ E-323LO RHOPLEX™ HG-74P, EMULSION™ E-1630, E-3233), epoxies or cross linked epoxies (ANCAREZ™ AR550, EPOTUF™ 37-147, ANCAREZ™ AR550), alkyd, modified alkyds, acrylic latex, acrylic epoxy hybrid, urethane acrylic, polyurethane dispersions, are found to have a similar effect in that they exhibit the property of friction control.

Figure 5:
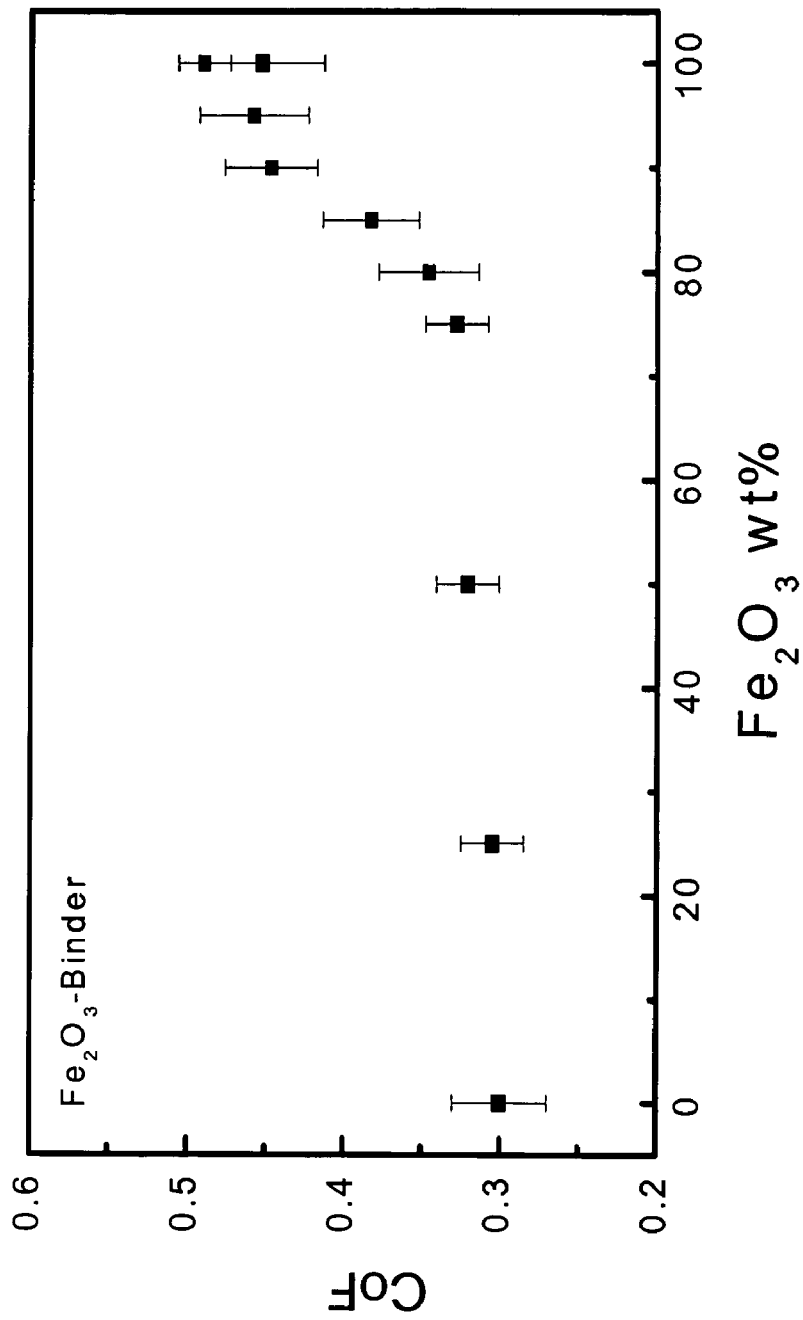
FIG. 5 shows the change in the coefficient of friction over a range of iron oxide:composition ratios in compositions comprising a film forming binder (DOW LATEX DL-226™). The composition comprising DOW LATEX DL-226™ and iron oxide were mixed and applied to the top of rail and the coefficient of friction was measured by a tribometer running on top of the dry film-coated rail.

FIG. 5 shows the results of a similar experiment using simplified compositions comprising a varying amount of binder DOW LATEX DL-226™ and varying amounts of iron oxide (to simulate the surface of a rail). The DOW LATEX DL-226™ and iron oxide mixtures were prepared in water, applied to the surface of a rail, dried, and the coeffecient of friction (sliding CoF) determined as above, using a push tribometer. The compositions comprised from 0 wt% to 100 wt% iron oxide in place of binder. These compositions did not comprise a friction modifier. As mentioned above, varying the amount of iron oxide in the composition simulates varying the application rates of the composition, with low amounts of iron oxide simulating a high application rate of the composition, and high amount of iron oxide simulating low rates of application. The coefficient of friction was measured multiple times for each composition comprising varying amounts of iron oxide/binder and the mean value and standard deviation for each composition is shown in FIG. 5.

In the absence of binder (100 wt% iron oxide) the CoF is at least 0.45 (FIG. 5). Increasing the amount of the binder (DOW LATEX DL-226™) in the composition to 100 wt% (0 wt% iron oxide) reduces the CoF to 0.3.

As before when using the binder RHOPLEX™ AC-264, a wide range in the rate of application of the binder DOW LATEX DL-226™, from about 17 wt% to 100 wt% DOW LATEX DL-226™ (i.e. 0 to about 83 wt% iron oxide) is able to maintain the CoF between 0.3 and 0.4.

Composition Comprising Binder (Retentivity Agent) and a Liubricant

Figure 2C:
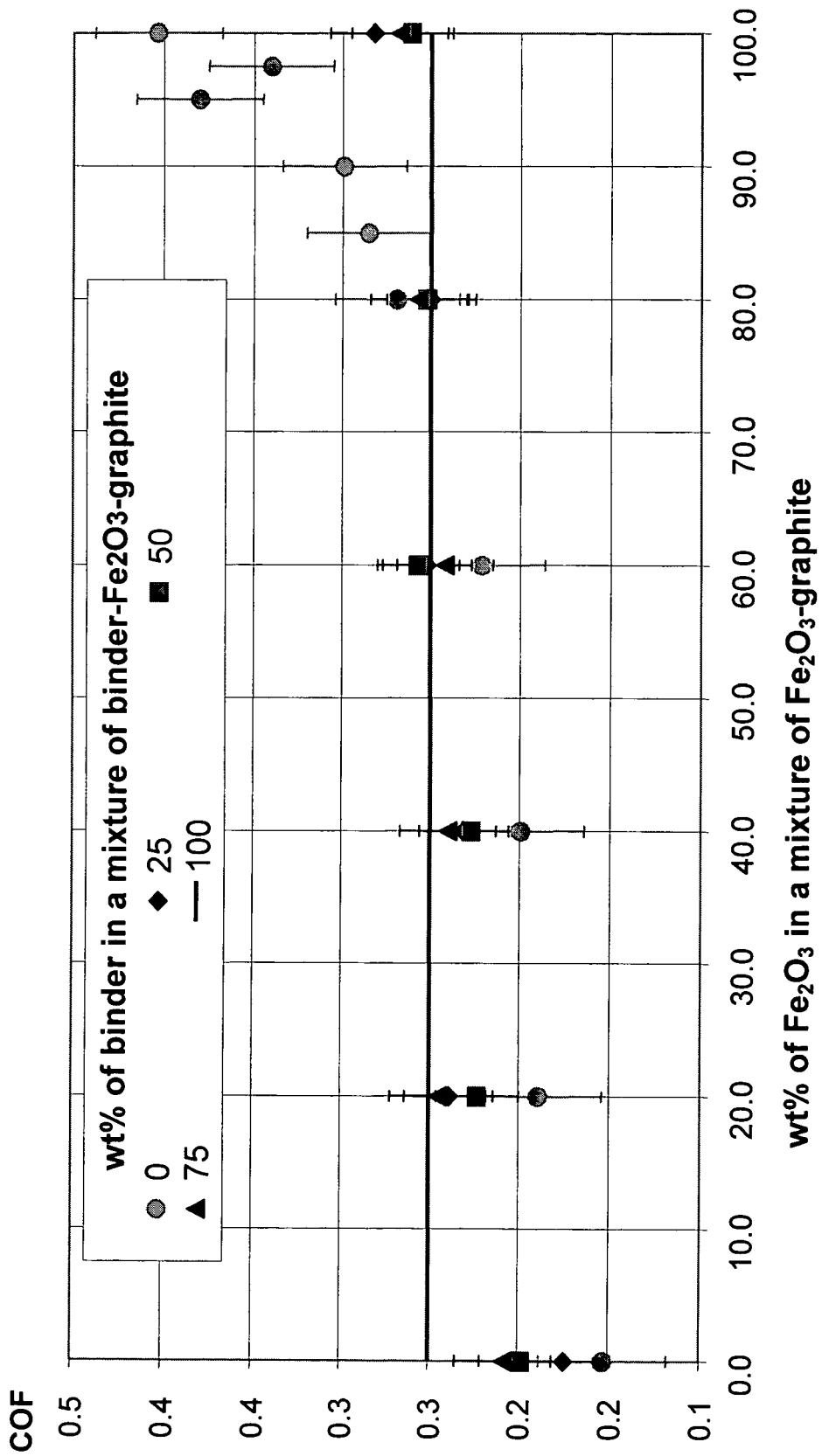
FIG. 2c shows the change in the coefficient of friction over a range of iron oxide:composition ratios in compositions comprising graphite and a film forming binder (RHOPLEX™ AC-264; ●: 0 wt% binder; ♦:25 wt% binder; ■: 50 wt% binder; ▲:75 wt% binder; the solid line is the CoF for 100 wt% binder).
Figure 2D:
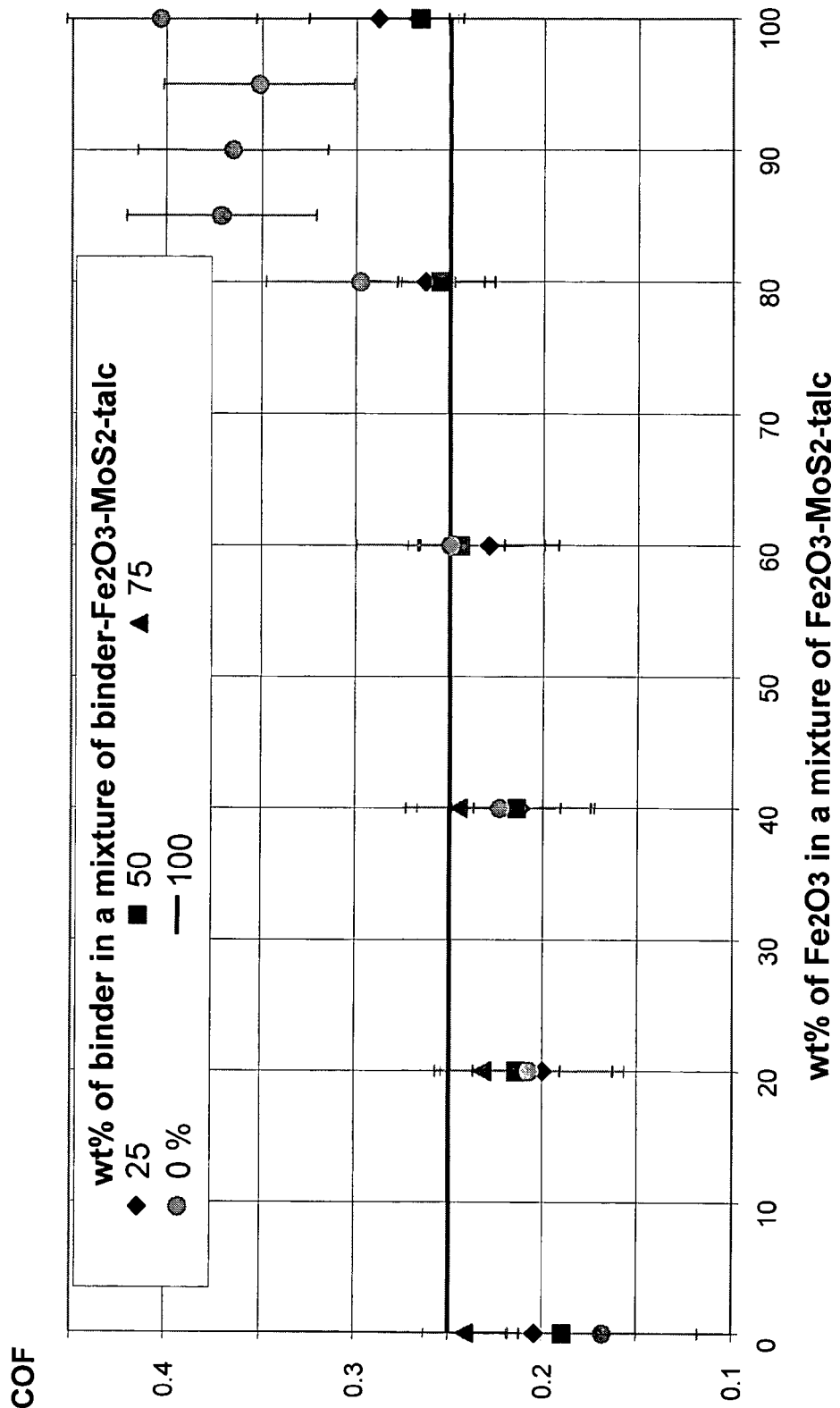
FIG. 2d shows the change in the coefficient of friction over a range of iron oxide:composition ratios in compositions comprising molybdenum disulfide and a film forming binder (RHOPLEX ™ AC-264; ●: 0 wt% binder; ♦:25 wt% binder; ■: 50 wt% binder; ▲:75 wt% binder; the solid line is the CoF for 100 wt% binder).
Figure 2E:
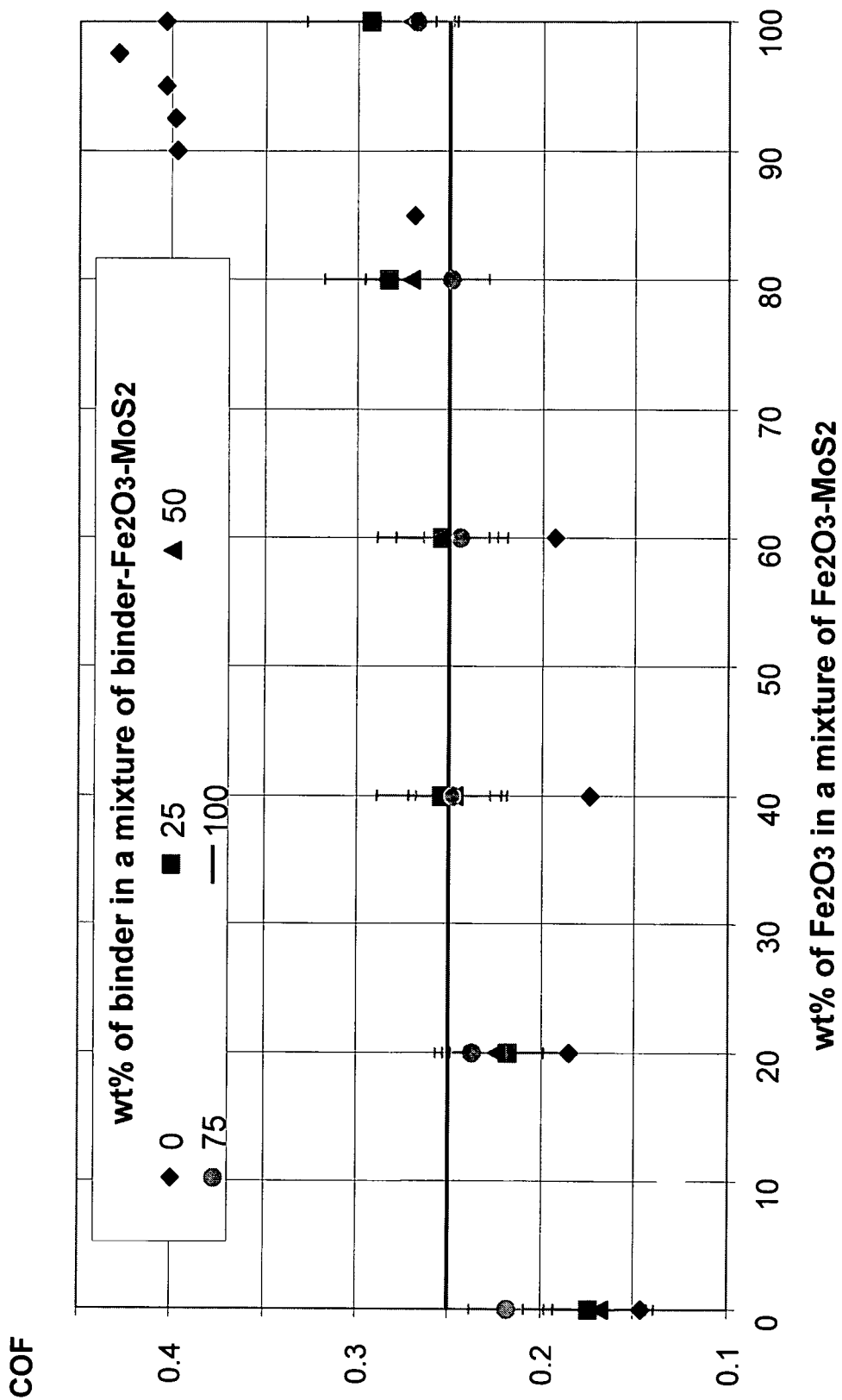
FIG. 2e shows the change in the coefficient of friction over a range of iron oxide:composition ratios in compositions comprising molybdenum disulfide, a friction modifier (talc), and a film forming binder (RHOPLEX™AC-264; ●: 0 wt% binder; ♦:25 wt% binder; ■: 50 wt% binder; ▲:75 wt% binder; the solid line is the CoF for 100 wt% binder).

A similar experiment using simplified compositions comprising a varying amount of a binder, for example RHOPLEX™ AC-264, varying amounts of iron oxide (to simulate the surface of a rail), and varying amounts of a lubricant, either graphite or molybdenum disulphide were prepared in water, applied to the surface of a rail, dried, and the coeffecient of friction (sliding CoF) determined as above, using a push tribometer. The compositions comprised from 0 wt% to 100 wt% iron oxide plus lubricant, in place of binder as indicated in FIGS. 2c, 2e. These compositions did not comprise a friction modifier. For comparative purposes, compositions comprising from 0 wt% to 100 wt% iron oxide, lubricant and talc (a friction modifier), in place of a binder were prepared and tested as indicated in FIGS. 2d. Varying the amount of iron oxide in the composition simulates varying the application rates of the composition, with low amounts of iron oxide simulating a high application rate of the composition, and high amount of iron oxide simulating low rates of application. The results are shown in FIGS. 2c, 2d and 2e.

With reference to FIGS. 2c and 2e, a CoF of 0.3±0.05 is obtained over a range of the amount of iron oxide-lubricant within the mixture applied to the rail surface from about 20 wt % to 100% iron oxide plus lubricant, for each of the compositions comprising 25 wt %, 50 wt % or 75 wt % binder. Similar results are obtained when a friction modifier is added to the mixture. These results also show that an effective CoF of 0.3±0.05 may be obtained over a range of rust conditions of the rail using a binder, and that the addition of a friction modifier does not increase the range for the desired CoF.

EXAMPLE 3

Friction Control Compositions Comprising Lubricant and Binder

Analysis of Coefficient of Friction

Figure 3A:
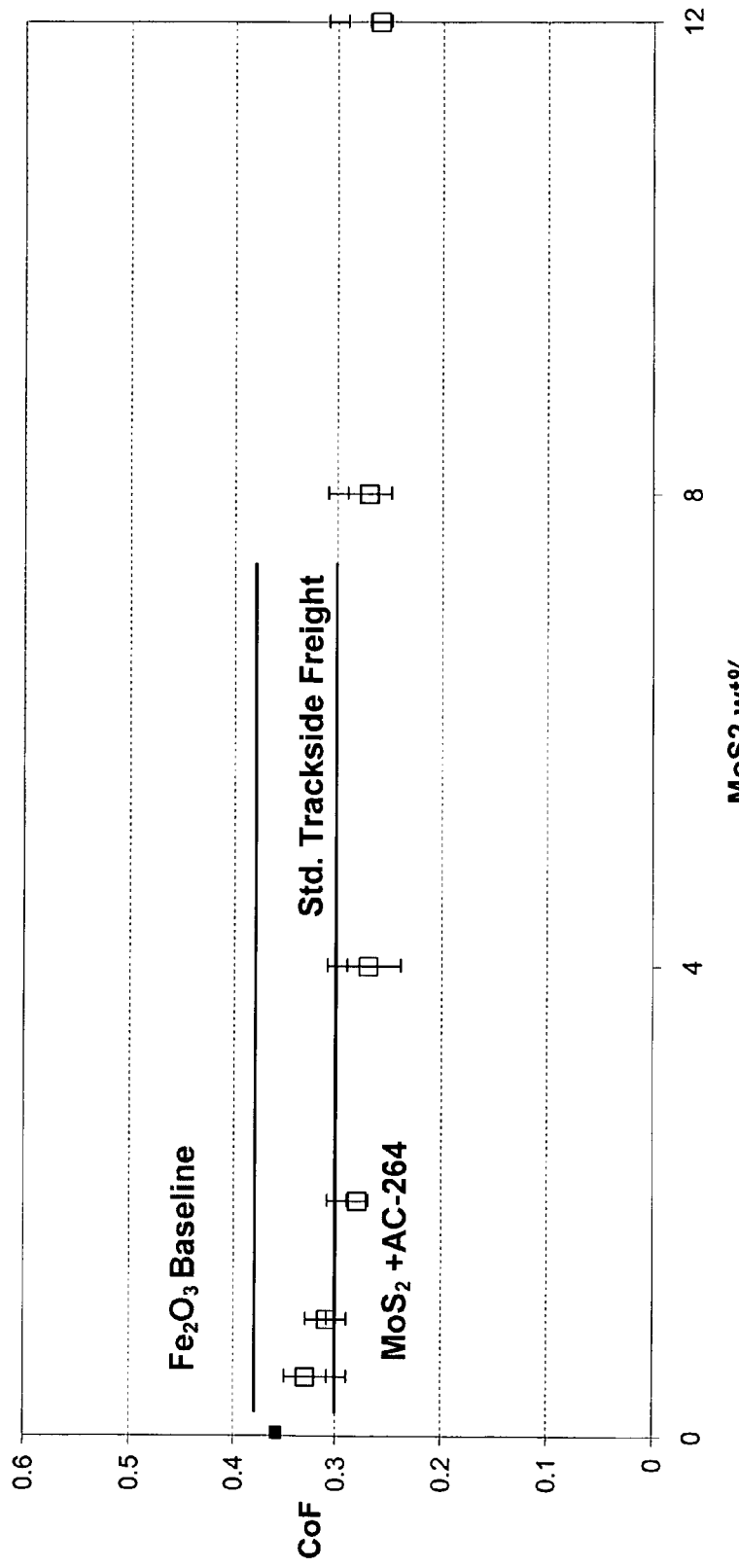
FIG. 3a shows the effect of increasing the amount of molybdenum disulfide on the coefficient of friction in a composition comprising a film forming binder (RHOPLEX™ AC-264, at 8.8 wt%), in the presence of iron oxide.
Figure 3B:
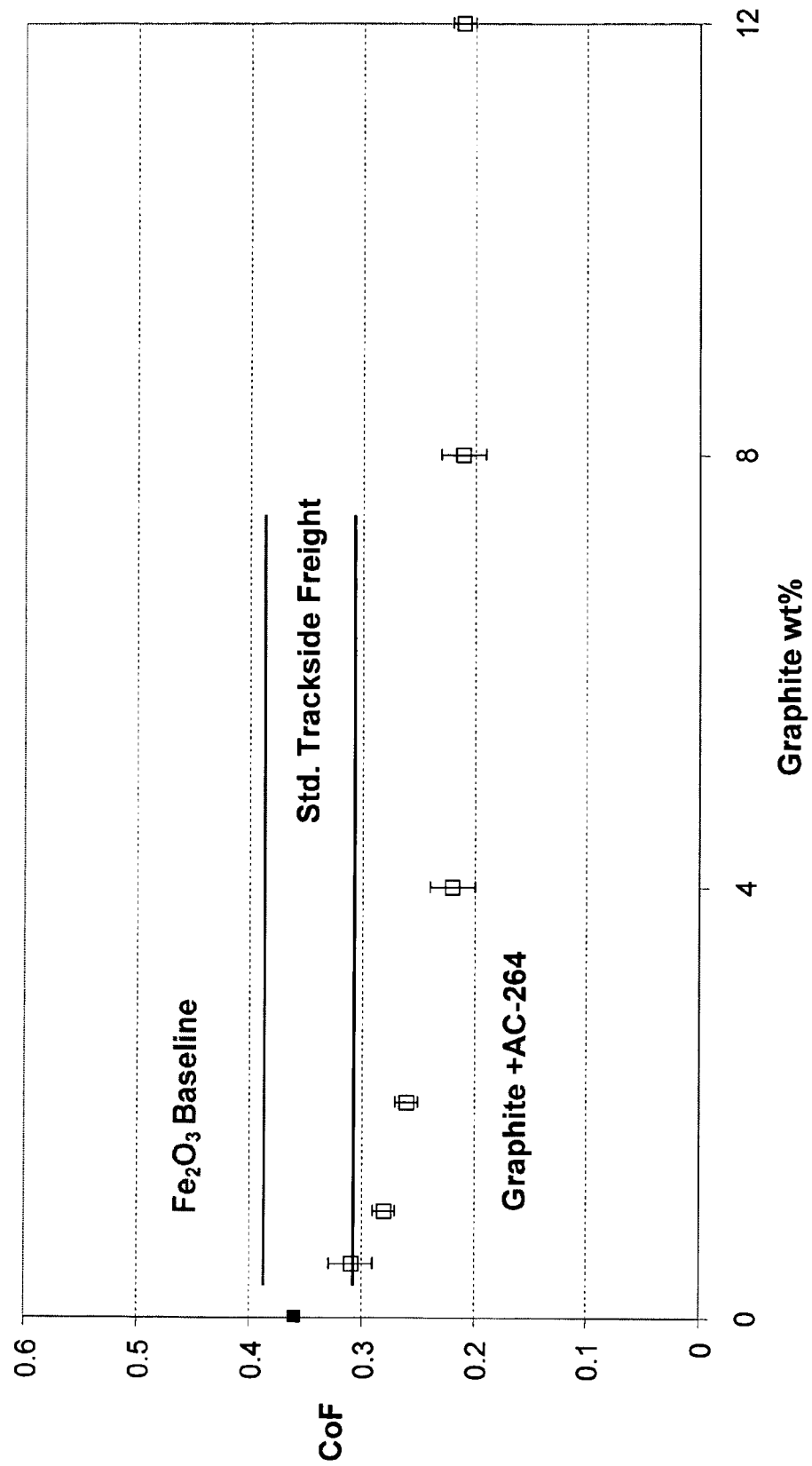
FIG 3b shows the effect of increasing the amount of graphite on the coefficient of friction in a composition comprising a film forming binder (RHOPLEX™ AC-264, at 8.8 wt%). $MoS_2$: molybdenum disulfide; $Fe_2O_3$ baseline: the coefficient of friction in the presence of iron oxide. Std. Trackside Freight: prior art friction control composition (available through Kelsan Technologies Corp.).

A set of friction control compositions comprising varying amounts of lubricant, either molybdenum disulfide or graphite, from 0 wt% to 12 wt%, and a fixed amount of binder (8.8 wt%), for example RHOPLEX™ AC-264, were prepared in water and applied to the surface of a rail and the CoF (sliding CoF) determined using a push tribometer (see Example 2). The results are shown in FIGS. 3a and 3b.

In the absence of lubricant, the binder exhibits a CoF of about 0.35 (FIG. 3a), similar to that observed in Example 2 (FIG. 2b). With increasing amounts of lubricant, there is decrease in the CoF, and in composition comprising greater than about 2 wt % molybdenum disulfide, the CoF decreases below 0.3. However, compositions comprising from about 0 wt % to about 2 wt % molybdenum disulfide and 8.8 wt %/o binder, exhibit a CoF above 0.3. Similar results are observed in compositions comprising graphite (FIG. 3b).

These results show that the presence of a low amount of binder in the composition increases the range in the amount of lubricant that may be added to the composition that results in a CoF of 0.3 or more. Therefore, increasing the amount of binder will permit the use of an increased amount of lubricant and still obtain a CoF between 0.3 and 0.4. For example, which is not to be considered limiting in any manner, the amount of binder may vary from about 1 wt % to about 75 wt %, or 1 wt % to about 50 wt %, or 1 wt % to about 25 wt %, and the lubricant may vary from 0 to about 10 wt %, depending on the binder used.

These results demonstrate that the range of CoF can be maintained between 0.3 and 0.45, by varying the amount of binder, lubricant, or both binder and lubricant within a friction modifier composition.

Effect of Various Binders on the CoF

Figure 3C:
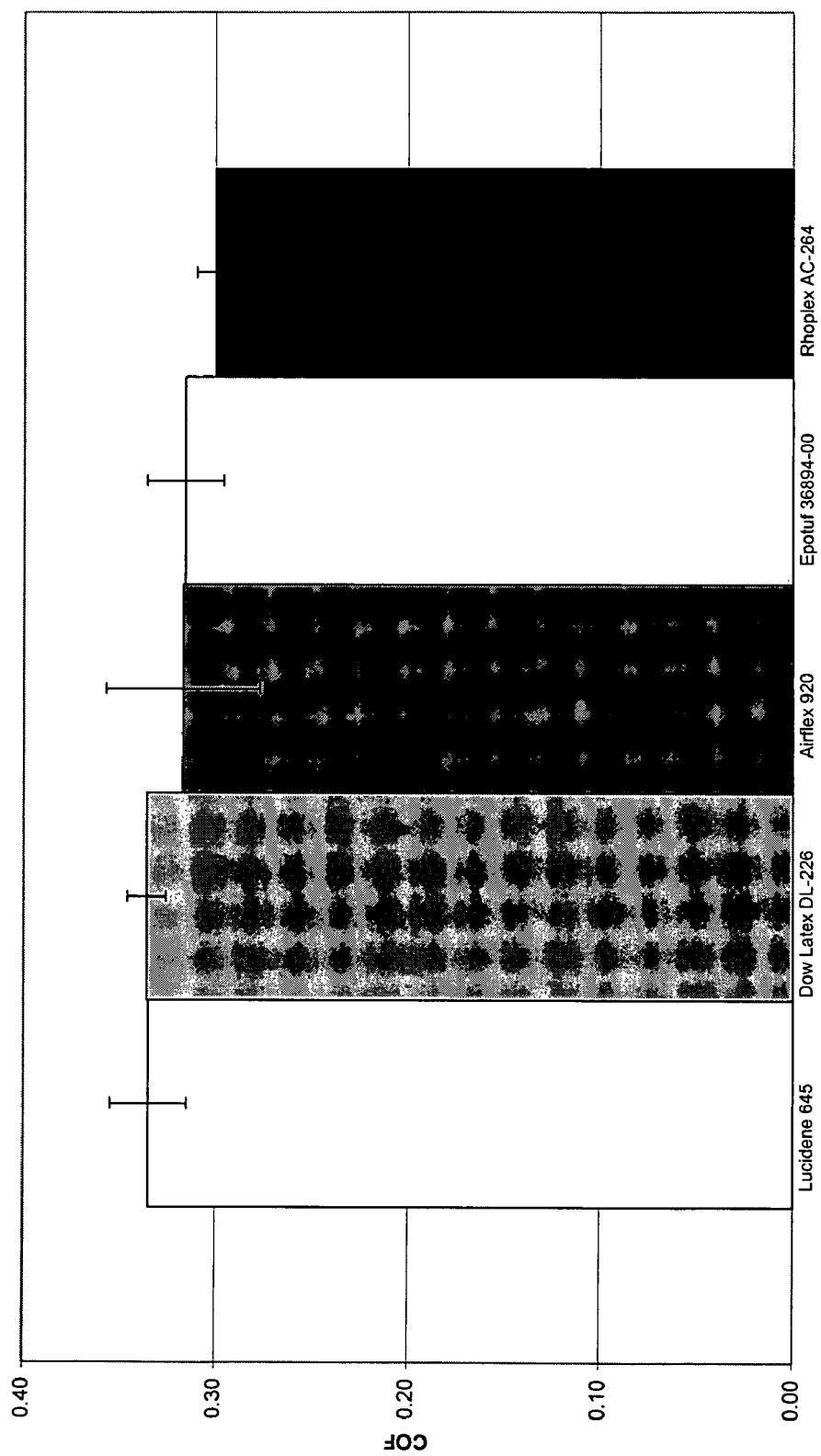
FIG. 3c shows the on the coefficient of friction for compositions comprising various binders(see example 3).

The CoF was determined using a push tribometer (see example 2) for various compositions comprising a lubricant, different binders, a rheological agent, consistency modifier, a wetting agent, and dispersants as listed below. These compositions do not comprise a friction modifier. The results are shown in FIG. 3c.

TABLE 1

Compositions comprising various binders (Lu: LUCIDENE ™ 645; DL: DOW LATEX DL-226 ™; Af: AIRFLEX ™ 920; Ep: EPOTUF ™ 36894-00; Rh: RHOPLEX ™ AC-264)

| ADDITIVE | Lu Wt % | DL Wt % | Af Wt % | Ep Wt % | Rh Wt % |
|---|---|---|---|---|---|
| WATER | 69.94 | 71.04 | 72.12 | 68.66 | 66.89 |
| MECELLOSE ™ PMC-40H | 2.5 | 2.5 | 2.5 | 2.5 | 2.5 |
| VANWET-CO-630 ™ | 0.10 | 0.10 | 0.10 | 0.10 | 0.10 |
| AMP 95 ™ | 0.10 | 0.10 | 0.10 | 0.10 | 0.10 |
| COLLOIDS ™ 643 | 0.50 | 0.50 | 0.50 | 0.50 | 0.50 |
| MOLYBDENUM DISULPHIDE UP-10 | 1.00 | 1.00 | 1.00 | 1.00 | 1.00 |
| PROPYLENE GLYCOL | 14.0 | 14.0 | 14.0 | 14.0 | 14.0 |
| OXABAN A ™ | 0.10 | 0.10 | 0.10 | 0.10 | 0.10 |
| Binder | 11.76 | 10.56 | 9.58 | 13.04 | 8.71 |
| Total | 100.00 | 100.00 | 100.00 | 100.00 | 100.00 |

With reference to FIG. 3c, it can be seen that for each of the compositions listed in Table 1, a CoF of about 0.3 to about 3.4 is obtained using from about 8.7 wt % to about 11.8 wt % binder in the composition. These results demonstrate that a variety of binders may be used to achieve a CoF of 0.35±0.07

Retentivity of Compositions

Compositions comprising a lubricant and binder were examined to determine their retentivity on a rail surface.

Friction control compositions comprising molybdenum disulfide or graphite (0.5 wt% or 1.0 wt%), and a fixed amount of binder (8.8 wt%), for example RHOPLEX™ AC-264, were prepared in water and applied to the surface of a rail. Two prior art compositions that have enhanced retentivity (see US Publications 2003 0195123 and 2004 038831; compositions comprising a rheological agent, antioxidant; and one or more of a retentivity agent, a lubricant and a friction modifier) were also tested.

The removal times for the compositions were determined using the Amsler machine as described in Example 1. The compositions were applied using a fine paint brush to ensure complete coating of the surface of the rail disc. The amount of applied composition was determined by weighing the disc before and after application of the composition. The discs were loaded onto the Amsler machine, brought into contact with each other, and placed under a load of about 760 N. Tests were performed at 3-4% creep level (disc diameters 53 mm and 49.5 mm). The coefficient of friction was determined by computer from the torque measured to turn the two wheels of the Amsler machine at a constant speed (232.2 RPM). The time required to remove each sample from the discs, the removal time (retentivity (s)), was taken to be the time required to reach the indicated consumed weight. The results demonstrate that compositions comprising lubricant and binder exhibit a similar enhanced retentivity to those of prior art compositions.

EXAMPLE 4

Analysis of Glass Transition Temperature (Tg) of Binders

The glass transition temperature may be defined as the temperature at which an amorphous polymer (or the amorphous regions in a partially crystalline polymer) changes from a hard and relatively brittle condition to a viscous or rubbery condition.

A selection of binders (retentivity agents) were analysed to determine their retentivity and their glass transition temperatures. Retentivity was determined using an amsler machine as described above in Example 3. The retentivity determined for RHOPLEX™ AC-264 was set at 100%, and the relative retentivity of other binders was compared to RHOPLEX™ AC-264. The glass transition temperature, expressed as Tg° C., was determined using standard methods known in the art. The results are presented in Table 2.

TABLE 2

Retentivity and glass transition temperatures of binders

| Binder | Polymer type | Retentivity %* | Tg(° C.) |
|---|---|---|---|
| RHOPLEX ™ AC-264 | Acrylic | 100 | 16 |
| ACRONAL ™ | Styrene acrylate | ~100 | 22 (varies) |
| AQUAZOL ™ 50/500 | Oxazoline | ~90 | 69 |
| Dl-240 | Styrene butadiene | 193 | 2 |
| AIRFLEX ™ 728 | Poly(vinylacetate vinylchloride-ethylene) | 210 | 0 |
| HYBRIDUR ™ 570 | Acrylic-urethane | 160 | −30 (varies) |
| DL-226 (with AO**) | Styrene butadiene | 220 | −16 |
| ANCAREZ ™ AR550 | Epoxy | 239 | ~20 |
| Crosslinked ANCAREZ ™ AR550 | Epoxy | 282 | ~20 |

*retentivity expressed as a percent compared to RHOPLEX ™ AC-264;
**AO: antioxidant All of the binders tested in Table 2 impart enhanced retentivity to a friction control composition. As can be generally deduced from this Table, compounds with a lower Tg tend to exhibit a greater retentivity, when compared to the acrylic binder RHOPLEX™ AC-264. Exceptions exist, for example, epoxies exhibit higher retentivity compared to RHOPLEX™ AC-264, yet have a Tg at room temperature.

TABLE 3

Properties of carboxylated styrene butadiene latex polymers

| Name | pH | Viscosity (cps) | Tg (° C.) |
|---|---|---|---|
| TYLAC ® 68221-00 | 8.5 | 500 | −40 |
| DL 220 | 8-9 | 175 | −30 |
| DL 226 | 7.5-8.5 | 500 | −14 |
| DL 240 | 5-6 | 500 | 2 |
| DL 238 | 7.5-8.5 | 500 | 9 |
| DL 275 | 7-8 | 500 | 42 |

Figure 4:
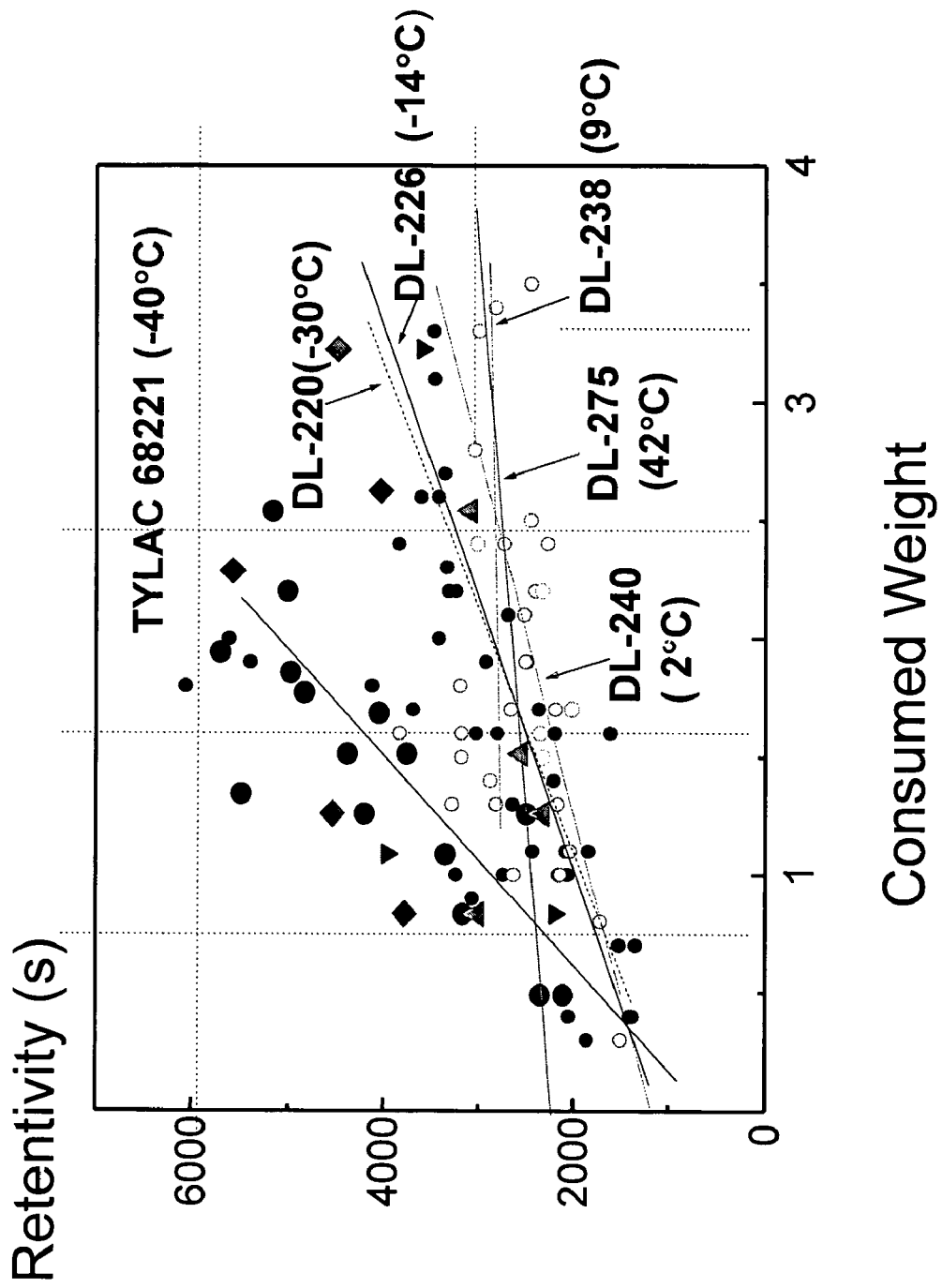
FIG. 4 shows the retentivity of several friction control compositions comprising binders (TYLAC® 68221; DL-220; DL-226; DL-240; DL-275; DL-238) having different glass transitions temperatures (Tg in brackets; see Example 4 for details) and determined using an amsler machine.

The retentivity for each of these polymers is shown in FIG. 4. In general, polymers characterized as having a lower Tg, for example TYLAC® 68221 (Tg of −40° C.) exhibits increased retentivity, with less of the composition removed over the test period (and having greater slope), when compared to compositions characterized as having a higher Tg (−30 to −14° C.; compositions exhibit an intermediate slope, e.g. DL-226), and these compositions exhibit greater retentivity when compared to compositions comprising polymers with a Tg from 2 to 42° C. (having a low slope, e.g. DL-238).

These data again demonstrate that polymers having a lower Tg, are characterized as having a greater retentivity.

EXAMPLE 5

Friction Control Compositions Comprising Binder and Lubricant

Examples of sample friction control compositions comprising a binder (retentivity agent) and varying amounts of lubricant are presented in Table 4.

TABLE 4

Sample Friction Modifier Compositions A, B and C

| | Percent (wt %) | | |
|---|---|---|---|
| Component | A | B | C |
| Water | 71.9 | 72.4 | 72.9 |
| Propylene Glycol | 15.00 | 15.00 | 15.00 |
| MECELLOSE ™ PMC-40H1* | 2.50 | 2.50 | 2.50 |
| Molybdenum sulfide | 1.00 | 0.50 | 0 |
| Colloids 675 (defoamer) COLLOIDS 675 ™ | 0.50 | 0.50 | 0.50 |
| RHOPLEX ® AC-264 (binder) | 8.80 | 8.80 | 8.80 |
| OXABAN ® A (biocide) | 0.10 | 0.10 | 0.10 |
| CO-630 ™ (surfactant) | 0.10 | 0.10 | 0.10 |
| AMP 95 ™ (pH adjust) | 0.10 | 0.10 | 0.10 |

*hydroxypropyl methylcellulose; rheological agent

Examples of sample friction control compositions comprising various amounts of binder (retentivity agent) and lubricant are presented in Table 5.

TABLE 5

Sample Friction Modifier Compositions D, E and F

| | Percent (wt %) | | |
|---|---|---|---|
| Component | D | E | F |
| Water | 66.2 | 72.4 | 79.2 |
| Propylene Glycol | 15.00 | 15.00 | 15.00 |
| MECELLOSE ™ PMC-40H1* | 2.50 | 2.50 | 2.50 |
| Molybdenum sulfide | 0.50 | 0.50 | 0.50 |
| COLLOIDS ™ 675 (defoamer) | 0.50 | 0.50 | 0.50 |
| RHOPLEX ® AC-264 (binder) | 15.00 | 8.80 | 2.00 |
| OXABAN ® A (biocide) | 0.10 | 0.10 | 0.10 |
| CO-630 ™ (surfactant) | 0.10 | 0.10 | 0.10 |
| AMP 95 ™ (pH adjust) | 0.10 | 0.10 | 0.10 |

*hydroxypropyl methylcellulose; rheological agent

The amount of propylene glycol may be modified as required to enhance low temperature performance. The compositions of Table 5 were prepared as outlined above, and tested using an amsler machine or the sliding coefficient of friction (dynamic CoF) measured using a pushed tribometer (Salient high speed).

The compositions of Table 4 and 5 were tested using the Amsler machine (3% creep level) to determine the length of time the composition maintains a low and steady coefficient of friction. The analysis was stopped when the coefficient of friction reached 0.4. The presence of a binder (retentivity agent) imparts an increase in friction modifying property of the compositions. Furthermore, the binder increases the duration of the effect (reduced coefficient of friction) of the compositions. Similar results are observed using a push tribometer. Furthermore, substitution of RHOPLEX™ AC-264 with other binders, for example acrylics (RHOPLEX™ AC 264, RHOPLEX™ MV-23LO or MAINCOTE™ HG56), polyvinyls, polyvinyl alcohol, poly(vinylacetate vinylchloride ethylene), polyvinyl chloride, (AIRFLEX™ 728, EVANOL™, ROVACE™ 9100, or ROVACE™ 0165, oxazolines (AQUAZOL™ 50/500), styrene butadiene compounds (DOW LATEX 226™ & 240™), styrene acrylate (ACRONAL™ S 760, RHOPLEX™ E-323LO RHOPLEX ™ HG-74P, EMULSION™ E-1630, E-3233), epoxies or cross linked epoxies (ANCAREZ™ AR 550, EPOTUF™ 37-147, ANCAREZ™ AR550), alkyd, modified alkyds, acrylic latex, acrylic epoxy hybrid, urethane acrylic, polyurethane dispersions, are found to have a similar effect.

The composition of Tables 4 and 5 were applied on the top of rail using an atomized spray system comprising a primary pump that fed the liquid composition from a reservoir through a set of metering pumps. The composition was metered to an air-liquid nozzle where the primary liquid stream was atomized with 100 psi air. In such a manner a controlled amount of a composition may be applied onto the top of the rail. Application rates of 0.05 L/mile, 0.1 L/mile 0.094 L/mile and 0.15 L/mile were used. The composition was applied on a test track, high tonnage loop 2.7 miles long consisting of a range of track sections encountered under typical conditions. Test trains accumilate 1.0 million gross ton (MTG) a day traffic density, using heavy axel loads of 39 tons. Train speed was set to a maximum of 40 mph. During the trials draw bar pull, and lateral force were measured using standard methods.

On uncoated track (no top of rail treatment, however, wayside lubrication, typically oil, was used) lateral forces vary from about 9 to about 13 kips. Application of the composition of Table 4 and 5 to the top of rail results in a decrease in lateral force. Similar results are observed with the compositions of Tables 4 and 5 in the presence or absence of binder (retentivity agent).

In order to examine retentivity of the compositions of Tables 4 and 5, the compositions were applied to the top of rail and let set for 16 hours prior to train travel. Reduced lateral force was observed for about 5000 axle passes. In the absence of any retentivity agent, an increase in lateral force was observed following 100-200 axle passes.

A reduction in drawbar force (kw/hr) was also observed following the application of the compositions of Tables 4 and 5 to the top of rail.

This liquid friction control composition of Tables 4 and 5 may be applied to a rail as an atomized spray, but is not intended to be limited to application as an atomized spray, nor is the composition intended to be used only on rails.

EXAMPLE 6

Liquid Friction Control Compositions

This example describes the preparation of liquid frictional control compositions characterized in exhibiting a low coefficient of friction, with or without the binder (retentivity agent) RHOPLEX® AC 264. The components of these compositions are listed in Table 6.

TABLE 6

Sample friction modifier composition

| | Percentage (wt %) | |
|---|---|---|
| Component | with retentivity agent | no retentivity agent |
| Water | 68.77 | 74.01 |
| Propylene Glycol | 15.57 | 16.27 |
| MECELLOSE ™ PMC-40H1 | 7.76 | 8.11 |
| Molybdenum Disulphide | 1.0 | 1.0 |
| Ammonia | 0.38 | 0.4 |
| RHOPLEX ® AC 264 | 6.33 | 0 |
| Biocide (OXABAN ® A) | 0.08 | 0.08 |
| CO-630 ™ | 0.11 | 0.11 |

The retentivity of these compositions is determined using an Amsler machine as outline in example 1. The number of cycles for each composition at a 30% creep level is determined at the point where the coefficient of friction reached 0.4. In the absence of retentivity agent, the number of cycles for the composition, prior to reaching a coefficient of friction of 0.4 is less than in the presence of the retentivity agent.

EXAMPLE 7

Compositions Comprising Antioxidants

Styrene Butadiene Binder

Compositions were prepared as outlined in Example 1, however, a synergistic blend of thioester and hindered phenol, in this case OCLITE® 424-50, as an antioxidant, was added, along with the binder (e.g. DOW 226®) to the composition in step 1 of the standard manufacturing process. This composition comprises a styrene butadiene based retentivity agent (DOW 226NA®).

TABLE 7

Antioxidant Sample Composition with a Styrene Butadiene Binder

| Component | No AO* wt % | With AO wt % | With AO (no binder) wt % |
|---|---|---|---|
| Water | 60.99 | 60.58 | 71.61 |
| DOW 226NF ® | 11.03 | 11.03 | — |
| MECELLOSE ™ | 7.35 | 7.35 | 7.35 |

TABLE 7-continued

Antioxidant Sample Composition with a Styrene Butadiene Binder

| Component | No AO* wt % | With AO wt % | With AO (no binder) wt % |
|---|---|---|---|
| PMC-40H 1 | | | |
| OCTOLITE ® 242-50 | — | 3.2 | 3.2 |
| Molybdenium Disulfide | 1.0 | 1.0 | 1.0 |
| OXABAN ® A | 0.07 | 0.07 | 0.07 |
| Methyl Hydride | 4.75 | 4.75 | 4.75 |
| Propylene Glycol | 14.7 | 14.7 | 14.7 |
| CO 630 ™ | 0.11 | 0.11 | 0.11 |

*AO—antioxidant

The retentivity of these compositions is determined using an amsler machine, as described in Example 1. Each composition was painted onto 8 discs with dry weights ranging from one to seven grams. The discs were allowed at least two hours to dry, and then run on the Amsler at 3% creep. Each run was converted into a point based on the mass of the friction control composition consumed and the time taken to reach a Coefficient of Friction (CoF) of 0.40. These points (mass, time) were graphed and a regression applied. This gives a collection of points and a line of best fit for each sample. The points used to create the regression were converted into consumption rates (mass/time). These consumption rates were averaged, and a standard error calculated based on the data. A lower consumption rate is indicative of longer retentivity.

The consumption rate for the composition with DOW LATEX 226® (a styrene based retentivity agent) but without the antioxidant is greater than the consumption rate for the composition with DOW LATEX 226® and the antioxidant (OCTOLITE® 424-50,), demonstrating increased retentivity of the composition in the presence of an antioxidant. Similar results are also obtained using WINGSTAY® S (a styrenated phenol antioxidant) in combination with the retentivity agent.

Acrylic Base Binder

Compositions were prepared as outlined in Example 1, however, an antioxidant (in this case OCTOLITE® 424-50) was added to the composition in step 1 along with retentivity agent, during the standard manufacturing process. The retentivity agent in this case was an acrylic, RHOPLEX® AC-264. An example of an antioxidant based frictional control composition is outlined in Table 8.

TABLE 8

Antioxidant Sample Composition with an Acrylic based Retentivity Agent

| | Percentage (wt %) | |
|---|---|---|
| Component | with antioxidant | without antioxidant |
| Water | 60.00 | 63.20 |
| RHOPLEX ™ AC 264 | 8.82 | 8.82 |
| MECELLOSE ™ PMC-40H 1 | 7.35 | 7.35 |
| OCTOLITE ® 424-50 | 3.2 | — |
| Molybdenum Disulfide | 1.0 | 1.0 |
| Propylene Glycol | 14.7 | 14.7 |
| OXABAN ® A | 0.07 | 0.07 |
| Methyl Hydride | 4.75 | 4.75 |
| CO-630 ™ | 0.11 | 0.11 |

The retentivity of the compositions listed in Table 8 was determined using an amsler machine as described in Example 3. Consumption rates for the composition without the antioxidant is less than those observed with a composition comprising the acrylic based retentivity agent, RHOPLEX® AC 264, indicating an increase in retentivity of the composition in the presence of the antioxidant.

EXAMPLE 8

Compositions Comprising Different Antioxidants

Compositions were prepared as outlined in Example 1 with various antioxidants added to the composition in step 1, with or without a binder during, the standard manufacturing process. The antioxidants include:
- an amine type antioxidant, for example WINGSTAY® 29 (Goodyear Chemicals);
- a styrenated phenol type antioxidant, for example, WINGSTAY® S (Goodyear Chemicals);
- a hindered type antioxidant, for example, WINGSTAY® L (Goodyear Chemicals);
- a thioester type antioxidant, for example WINGSTAY® SN-1 (Goodyear Chemicals);
- a synergistic blend comprising a hindered phenol and a thioester, for example, OCTOLITE® 424-50 (Tiarco Chemical).

The compositions are listed in Table 9.

TABLE 9

Friction Control Compositions with an Antioxidant (AO; Wsty: WINGSTAY ®; Octo: OCTOLITE ®)

| Component | Percentage (wt %) | | | | | | |
|---|---|---|---|---|---|---|---|
| | No AO | Wsty 29 | Wsty S | Wsty L | Wsty SN-1 | Octo 424-50 | Octo 424-50 (HC) |
| Water | 53 | 52 | 52 | 52 | 52 | 52 | 51 |
| $MbS_2$ | 1 | 1 | 1 | 1 | 1 | 1 | 1 |
| Anti-oxidant | — | 1 | 1 | 1 | 1 | 1 | 2 |
| Propylene Glycol | 15 | 15 | 15 | 15 | 15 | 15 | 15 |
| Methyl Hydride | 10 | 10 | 10 | 10 | 10 | 10 | 10 |
| OXABAN ® A | 0.01 | 0.01 | 0.01 | 0.01 | 0.01 | 0.01 | 0.01 |
| CO 630 ™ | 0.1 | 0.1 | 0.1 | 0.1 | 0.1 | 0.1 | 0.1 |
| MECELLOSE ™ PMC-40H 1 | 7 | 7 | 7 | 7 | 7 | 7 | 7 |

The retentivity of the compositions listed on Table 9 was determined using an amsler machine as described in Example 3. All of the antioxidants showed an increase in the retentivity of the friction control composition as compared to a friction control composition that does not contain an antioxidant.

A similar set of compositions were prepared as outlined in Table 9, however, a retentivity agent (RHOPLEX AC-264®) was added (8.82 wt%) to the compositions, and the wt% of water reduced accordingly. The retentivity of the compositions was determined using an amsler machine. All of the antioxidants tested showed an increase in the retentivity of the friction control composition as compared to a friction control composition lacking an antioxidant.

EXAMPLE 10

Effect of Freezing Point Depressants

In this example, several candidate liquid freezing point depressants, which may form part of the liquid component of a friction control composition, were evaluated with respect to the time required to remove them from a pair of contacting metal surfaces simulating a rail/railcar wheel interface.

Freezing point depressants were identified by testing freezing point temperatures using a Freezing Point Device (from Nisku Instruments). A sample freezing point depressant was placed into the sample tube that was inserted within a Dewar flask containing solid carbon-dioxide cooled isopropyl alcohol. A thermometer and stirrer were placed within the sample tube. The freezing point of the sample is observed as a plateau in the drop of temperature of the sample. Freezing point depressants are determined by mixing the depressant with water, and determining the amount of depressant required to obtain a freezing point of −20° C. Freezing point depressants that were present at 50% (w/w) or less in the depressant-water mixture, and that exhibit a freezing point of −20° C. or less, were considered suitable for further testing.

Removal times for the freezing point depressants were determined using the amsler machine as described in Examples 1 and 3, except that only a freezing point depressant was applied to a clean rail disc in a controlled manner to produce a desired thickness of coating on the rail disc. The freezing point depressants were applied using a fine paint brush to ensure complete coating of the surface of the rail disc. The amount of applied composition is determined by weighing the disc before and after application of the composition. The amount of the coatings applied ranges from 2 to 12 mg/disc. The discs were loaded onto the amsler machine, brought into contact with each other, and placed under a load of about 760 N. The applied samples were tested immediately after their application to the rail disc with no dry time prior to testing. Tests were performed at 3-4% creep level (disc diameters 53 mm and 49.5 mm). The coefficient of friction was determined by computer from the torque measured to turn the two wheels of the Amsler machine at a constant speed (232.2 RPM). The time required to remove each sample from the discs, the removal time, is taken to be the time required to reach a coefficient of friction of 0.4. Results of this test are presented in Table 10.

TABLE 10

Retentivity properties of Freezing point depressants

| Freezing Point Depressant | Removal Time (sec) | Vapor Pressure (mm Hg) |
|---|---|---|
| ACROSOLV ™ PNB | 81 | 0.92 (at 25° C.) |
| PROGLYDE ™ DMM | 88 | 0.55 (at 25° C.) |
| ACROSOLV ™ PnP | 125 | 2.5 (at 25° C.) |
| ACROSOLV ™ PMA | 149 | 3.8 (at 25° C.) |
| ACROSOLV ™ PTB | 277 | 2.7 (at 25° C.) |

TABLE 10-continued

Retentivity properties of Freezing point depressants

| Freezing Point Depressant | Removal Time (sec) | Vapor Pressure (mm Hg) |
|---|---|---|
| DOWANOL ™ DPM | 738 | 0.28 (at 20° C.) |
| DOWANOL ™ DPnP | 1133 | 0.08 (at 20° C.) |
| Propylene Glycol | 2468 | 0.129 (at 25° C.) |
| Hexylene Glycol | 2785 | <0.1 (at 20° C.) |
| DOWANOL ™ DPnB | 4468 | 0.04 (at 20° C.) |
| ACROSOLV ™ TPM | 6046 | <0.1 (at 25° C.) |

These tests demonstrate that several freezing point depressants exhibit removal times that are lower than that of propylene glycol (2468 s), and are, therefore, suitable for use in friction control compositions of the present invention.

Some compositions of the present invention include a lubricant component, therefore the presence of a solvent component, which imparts a lubricating property to the composition, may be acceptable and the freezing point depressant component, need not be readily removable from the composition by evaporation, dehydration or decomposition. Freezing point depressants that exhibit removal times above that of propylene glycol may, therefore, also be used in the friction control compositions of the present invention.

Removal rates of the freezing point depressants correlates with their vapour pressure values, and vapour pressure values may be used as a means for selecting for a suitable candidate freezing point depressant. Freezing point depressants that are characterized as having a vapour pressure of about 0.1 (at 20° C.) or greater may be used in the friction control compositions exhibiting a positive friction characteristic, for example, compositions with no or a low amount of lubricant. Similarly, freezing point depressants that are characterized as having a vapour pressure of less than about 0.1 (at 20° C.) may be suitable for use in the friction control compositions comprising increased amounts of lubricant.

EXAMPLE 11

Liquid Friction Control Compositions Comprising FDP's

This example describes liquid compositions characterized in exhibiting a positive coefficient of friction. The components of these compositions and associated freezing points are listed in Table 11. In Table 11, in order from left to right, PG (propylene glycol); DOWANOL® DPM; PROGLYDE® DMM (two concentrations); ACROSOLV® PTB; ACROSOLV® PnP; and CRYOTECH® PnP are used as freezing point depressants (FDP's).

Combinations of freezing point depressants may also be used in the compositions described herein, as synergistic effects, of reduced freezing points, are observed when two or more freezing point depressants were mixed together. For example, compositions comprising both propylene glycol (at 7% w/w) and DOWANOL® DPM (at 23.5% w/w) exhibited a freezing point of −24.5° C. (see Table 16), yet a composition comprising either propylene glycol or DOWANOL® DPM on its own at 30.5%(w/w, the total amount of propylene glycol and DOWANOL® DPM) exhibits a freezing point of only −15° C., or −9° C., respectively. Similarly, a composition comprising both propylene glycol (at 14.83% w/w) and PROGLYDE® DMM (at 19.0% w/w) exhibits a freezing point of −28.0° C. (see Table 16). However, a composition comprising propylene glycol or PROGLYDE® DPM on its own at 33.83.0%(w/w, the total amount of propylene glycol and DOWANOL® DPM) exhibits a freezing point of only −20° C., or −10° C., respectively. Similar synergistic results are observed with other combinations of freezing point depressants (e.g. see Table 11).

TABLE 11

Friction control Compositions with FDP (freezing point depressant)

| Component (wt. %) | Standard | PG | DOWANOL ® DPM | PROGLYDE ® DMM (B) | PROGLYDE ® DMM (C) | ARCOSOLV ® PTB | ARCOSOLV ® PnP | CRYOTECH ® E36 |
|---|---|---|---|---|---|---|---|---|
| Water | 70.36 | 56.36 | 52.5 | 50.93 | 56.76 | 56.36 | 50.93 | 47.42 |
| Propylene Glycol | 14 | 14 | 7 | 14.83 | 15 | 16 | 14.2 | 14 |
| FDP | — | 14 | 23.5 | 19 | 13 | 12 | 19.43 | 20 |
| MECELLOSE ™ PMC-40H1 | 0.35 | 0.35 | 0.35 | 0.35 | 0.35 | 0.35 | 0.35 | 0.35 |
| HBR | — | — | — | — | — | — | — | 0.94 |
| METHOCEL ® K4M | 1 | 1 | 0.96 | — | — | — | — | — |
| METOLOSE ™ 60SH-4000 | — | — | — | 0.6 | 0.6 | 1 | 0.8 | — |
| TAMOL ® 731A | 0.22 | 0.22 | 0.22 | 0.22 | 0.22 | 0.22 | 0.22 | — |
| SURFYNOL ® CT-121 | 0.54 | 0.54 | 0.54 | 0.54 | 0.54 | 0.54 | 0.54 | 0.76 |
| COLLOIDS 675 ® | 0.5 | 0.5 | 0.5 | 0.5 | 0.5 | 0.5 | 0.5 | 0.5 |
| AMP-95 ™ | 0.1 | 0.1 | 0.1 | 0.1 | 0.1 | 0.1 | 0.1 | 0.1 |
| $MoS_2$ | 0.5 | 0.5 | 0.5 | 0.5 | 0.5 | 0.5 | 0.5 | 0.5 |
| RHOPLEX ® AC-264 | 11.93 | 11.93 | 11.93 | 11.93 | 11.93 | 11.93 | 11.93 | 11.93 |
| OXABAN ® A | 0.5 | 0.5 | 0.5 | 0.5 | 0.5 | 0.5 | 0.5 | 0.5 |
| Freezing Point (° C.) | −9 | −25.5 | −24.5 | −28 | −19.5 | −20 | −21 | −23 |

The liquid friction control compositions are prepared as outlined in Example 1, and may be applied to a rail as an atomized spray, but are not intended to be limited to application as an atomized spray, nor are the compositions intended to be used only on rails.

Each of the liquid control compositions is applied to a stretch of rail. The coefficient of friction of the top of rail was measured using a push tribometer and found in each case to be about 0.33. A locomotive consisting of 18 axles passed over the rail immediately after the product is applied. The liquid friction control compositions reduce lateral forces in rail curves, and reduces energy consumption.

EXAMPLE 12

Low Temperature Friction Control Compositions Comprising a Binder and Varying Amounts of Lubricant Examples of low temperature friction control compositions comprising a binder and varying amount of lubricant (molybdenum disulphide) and a freezing point depressant (propylene glycol) are presented in Table 12a and 12b.

TABLE 12a

Low Temperature Friction Control Composition with 0.5 Wt % Lubricant (Composition A)
Low Temp Composition A

| Additive | Wt % | Mass (g) |
|---|---|---|
| Water | 60.85 | 608.50 |
| MECELLOSE ™ PMC-40H 1 | 1.00 | 10.00 |
| CO 630 ™ | 0.10 | 1.00 |
| AMP 95 ™ | 0.10 | 1.00 |
| COLLOIDS 675 ™ | 0.10 | 1.00 |
| Glycol ether PnP | 12.00 | 120.00 |
| Molybdenum Disulphide | 0.50 | 5.00 |
| Propylene Glycol | 12.50 | 125.00 |
| MECELLOSE ™ PMC-40H 2 | 1.00 | 10.00 |
| Propylene Glycol Wash | 5.00 | 50.00 |
| OXABAN ® A | 0.10 | 1.00 |
| RHOPLEX ™ AC-264 | 6.75 | 67.50 |
| Total | 100.00 | 1000.00 |

TABLE 12b

Low Temperature Friction Control Composition with 1.0 Wt % Lubricant (Composition B)
Low Temp Composition B

| Additive | Wt % | Mass (g) |
|---|---|---|
| Water | 60.35 | 603.50 |
| MECELLOSE ™ PMG-40H 1 | 1.00 | 10.00 |
| CO 630 ™ | 0.10 | 1.00 |
| AMP 95 ™ | 0.10 | 1.00 |
| COLLOIDS ™ 675 | 0.10 | 1.00 |
| Glycol ether PnP | 12.00 | 120.00 |
| Molybdenum Disulphide | 1.00 | 10.00 |
| Propylene Glycol | 12.50 | 125.00 |
| MECELLOSE ™ PMC-40H 2 | 1.00 | 10.00 |
| Propylene Glycol Wash | 5.00 | 50.00 |
| OXABANA ® | 0.10 | 1.00 |
| RHOPLEX ™ AC-264 | 6.75 | 67.50 |
| Total | 100.00 | 1000.00 |

The coefficient of friction (CoF) of low temperature compositions A and B were determined using a push tribometer as set out in Example 2. The results are shown in Table 13 which also gives the baseline CoF for 0.5% and 1% molybdenum disulphide ($MoS_2$).

TABLE 13

Coefficient of Friction of Low Temperature Friction Control Compositions A and B

|  | CoF (Trial 1) | CoF (Trial 2) | CoF (Mean) |
|---|---|---|---|
| Baseline for 0.5% $MoS_2$ | 0.475 +/− 0.05 | 0.511 +/− 0.03 | 0.493 +/− 0.04 |
| Composition A | 0.358 +/− 0.02 | 0.375 +/− 0.02 | 0.367 +/− 0.02 |
| Baseline for 1.0% $MoS_2$ | 0.503 +/− 0.03 | 0.495 +/− 0.03 | 0.499 +/− 0.02 |
| Composition B | 0.369 +/− 0.03 | 0.367 +/− 0.02 | 0.368 +/− 0.02 |

The dry films of both composition A (0.5% wt $MoS_2$) and composition B (1.0% wt $MoS_2$) gave a coefficient of friction in the range 0.3-0.4.

All references are herein incorporated by reference.

The present invention has been described with regard to preferred embodiments. However, it will be obvious to persons skilled in the art that a number of variations and modifications can be made without departing from the scope of the invention as described herein. In the specification the word "comprising" is used as an open-ended term, substantially equivalent to the phrase "including but not limited to", and the word "comprises" has a corresponding meaning. Citation of references is not an admission that such references are prior art to the present invention.

The embodiments of the invention in which an exclusive property of privilege is claimed are defined as follows:

1. A method of controlling friction in a rail system by applying a friction control composition to one or more than one metal surface, the friction control composition comprising:
   a) from about 40 to about 80 weight percent water;
   b) from about 1.0 to about 25 weight percent binder;
   c) from 0 to about 3 weight percent lubricant; and
   d) from about 0.5 to about 5 weight percent rheological control agent,
   wherein the friction control composition does not comprise a friction modifier and maintains a co-efficient of friction between two metal surfaces from about 0.31 to about 0.45.

2. The method of claim 1, wherein the metal surface is a rail surface or wheel.

3. The method of claim 2, wherein the composition is sprayed onto the rail surface.

4. A method of reducing lateral force in a rail system comprising applying a friction control composition onto a wheel or top of rail, the friction control composition comprising:
   a) from about 40 to about 80 weight percent water;
   b) from about 1.0 to about 25 weight percent binder;
   c) from 0 to about 3 weight percent lubricant; and
   d) from about 0.5 to about 5 weight percent rheological control agent,
   wherein the friction control composition does not comprise a friction modifier and maintains a co-efficient of friction between two metal surfaces from about 0.31 to about 0.45.

5. A method of reducing energy consumption in a rail system comprising applying a friction control composition onto a wheel or top of rail, the friction control composition comprising:
   a) from about 40 to about 80 weight percent water;
   b) from about 1.0 to about 25 weight percent binder;
   c) from 0 to about 3 weight percent lubricant; and d) from about 0.5 to about 5 weight percent rheological control agent, wherein the friction control composition does not comprise a friction modifier and maintains a co-efficient of friction between two metal surfaces from about 0.31 to about 0.45.

6. The method of claim 4, wherein the composition is sprayed onto the top of rail.

7. The method of claim 5, wherein the composition is sprayed onto the top of rail.

8. The method of claim 1, wherein the friction control composition further comprises from 0 to about 5 weight percent of an anti-oxidant.

9. The method of claim 1, wherein the friction control composition further comprises from 0 to about 25 weight percent of a freezing point depressant.

10. The method of claim 1, wherein the friction control composition comprises a wetting agent, an antibacterial agent, a consistency modifier, a defoaming agent, or a combination thereof.

11. The method of claim 1, wherein the binder is selected from the group consisting of an acrylic, a polyvinyl alcohol, a polyvinyl chloride, an oxazoline, an epoxy, an alkyd, a urethane acrylic, a modified alkyd, an acrylic latex, an acrylic epoxy hybrids, a polyurethane, a styrene acrylate, and a styrene butadiene.

12. The method of claim 11, wherein the binder is a styrene butadiene compound.

13. The method of claim 4, wherein the friction control composition further comprises from 0 to about 5 weight percent of an anti-oxidant.

14. The method of claim 4, wherein the friction control composition further comprises from 0 to about 25 weight percent of a freezing point depressant.

15. The method of claim 4, wherein the friction control composition comprises a wetting agent, an antibacterial agent, a consistency modifier, a defoaming agent, or a combination thereof.

16. The method of claim 4, wherein the binder is selected from the group consisting of an acrylic, a polyvinyl alcohol, a polyvinyl chloride, an oxazoline, an epoxy, an alkyd, a urethane acrylic, a modified alkyd, an acrylic latex, an acrylic epoxy hybrids, a polyurethane, a styrene acrylate, and a styrene butadiene.

17. The method of claim 15, wherein the binder is a styrene butadiene compound.

18. The method of claim 5, wherein the friction control composition further comprises from 0 to about 5 weight percent of an anti-oxidant.

19. The method of claim 5, wherein the friction control composition further comprises from 0 to about 25 weight percent of a freezing point depressant.

20. The method of claim 5, wherein the friction control composition comprises a wetting agent, an antibacterial agent, a consistency modifier, a defoaming agent, or a combination thereof.

21. The method of claim 5, wherein the binder is selected from the group consisting of an acrylic, a polyvinyl alcohol, a polyvinyl chloride, an oxazoline, an epoxy, an alkyd, a urethane acrylic, a modified alkyd, an acrylic latex, an acrylic epoxy hybrids, a polyurethane, a styrene acrylate, and a styrene butadiene.

22. The method of claim 20, wherein the binder is a styrene butadiene compound.

* * * * *